(12) United States Patent
Marchetti-Bowick et al.

(10) Patent No.: US 11,531,346 B2
(45) Date of Patent: Dec. 20, 2022

(54) GOAL-DIRECTED OCCUPANCY PREDICTION FOR AUTONOMOUS DRIVING

(71) Applicant: UATC, LLC, San Francisco, CA (US)

(72) Inventors: Micol Marchetti-Bowick, Pittsburgh, PA (US); Poornima Kaniarasu, Pittsburgh, PA (US); Galen Clark Haynes, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 281 days.

(21) Appl. No.: 16/853,151

(22) Filed: Apr. 20, 2020

(65) Prior Publication Data

US 2021/0004012 A1 Jan. 7, 2021

Related U.S. Application Data

(60) Provisional application No. 62/991,799, filed on Mar. 19, 2020, provisional application No. 62/870,934, filed on Jul. 5, 2019.

(51) Int. Cl.
*G05D 1/02* (2020.01)
*G01C 21/34* (2006.01)
(Continued)

(52) U.S. Cl.
CPC ....... *G05D 1/0214* (2013.01); *B60W 60/0011* (2020.02); *G01C 21/3407* (2013.01);
(Continued)

(58) Field of Classification Search
None
See application file for complete search history.

(56) References Cited

U.S. PATENT DOCUMENTS

2018/0105174 A1* 4/2018 Russell ............ G08G 1/09626
2019/0113927 A1* 4/2019 Englard ............ G05D 1/0221
(Continued)

OTHER PUBLICATIONS

Bansal et al., "Chauffeurnet: Learning to Drive by Imitating the Best and Synthesizing the Worst", 2018, arxiv.org, arXiv.org: 1812.03079, 20 pages.
(Continued)

*Primary Examiner* — Tamara L Weber
(74) *Attorney, Agent, or Firm* — Dority & Manning, P.A.

(57) ABSTRACT

An autonomous vehicle can obtain state data associated with an object in an environment, obtain map data including information associated with spatial relationships between at least a subset of lanes of a road network, and determine a set of candidate paths that the object may follow in the environment based at least in part on the spatial relationships between at least two lanes of the road network. Each candidate path can include a respective set of spatial cells. The autonomous vehicle can determine, for each candidate path, a predicted occupancy for each spatial cell of the respective set of spatial cells of such candidate path during at least a portion of a prediction time horizon. The autonomous vehicle can generate prediction data associated with the object based at least in part on the predicted occupancy for each spatial cell of the respective set of spatial cells for at least one candidate path.

20 Claims, 11 Drawing Sheets

(51) Int. Cl.
*B60W 60/00* (2020.01)
*G05D 1/00* (2006.01)

(52) U.S. Cl.
CPC ......... *G05D 1/0088* (2013.01); *G05D 1/0221* (2013.01); *G05D 2201/0212* (2013.01); *G05D 2201/0213* (2013.01)

(56) References Cited

U.S. PATENT DOCUMENTS

| | | | |
|---|---|---|---|
| 2019/0258251 A1* | 8/2019 | Ditty | G06V 20/58 |
| 2020/0174481 A1* | 6/2020 | Van Heukelom | B60W 60/0011 |
| 2020/0182633 A1* | 6/2020 | Liu | B60W 60/001 |
| 2020/0307561 A1* | 10/2020 | Bush | B60W 60/00274 |
| 2020/0379461 A1* | 12/2020 | Singh | B60W 60/00276 |

OTHER PUBLICATIONS

S. Casas et al., "Intentnet: Learning to Predict Intention from Raw Sensor Data", Oct. 29-31, 2018, Proceedings of the 2nd Conference on Robot Learning, vol. 87 of Proceedings of Machine Learning Research, pp. 947-956.

Cui et al., "Multimodal Trajectory Predictions for Autonomous Driving Using Deep Convolutional Networks" 2018, Computing Research Repository, 7 pages.

Djuric et al., "Motion Prediction of Traffic Actors for Autonomous Driving Using Deep Convolutional Networks", 2018, arxiv.org, arXiv:1808.05819, 10 pages.

Kumar et al. "Learning-Based Approach for Online Lane Change Intention Prediction.", 2013, IEEE Intelligent Vehicles Symposium (IV), 6 pages.

Luo et al., "Fast and Furious: Real Time End-to-End 3d Detection, Tracking and Motion Forecasting With a Single Convolutional Net" 2018, In Proceedings of the IEEE Conference on Computer Vision and Pattern Recognition, pp. 3569-3577.

Rudenko et al., "Human Motion Trajectory Prediction: A survey", 2019, arxi.org, arXiv:1905:06113, 37 pages.

Sandler et al., "Mobilenetv2: Inverted Residuals and Linear Bottlenecks", Jun. 2018, In the IEEE Conference on Computer Vision and Pattern Recognition, 14 pages.

* cited by examiner

GOAL-DIRECTED OCCUPANCY PREDICTION FOR AUTONOMOUS DRIVING

RELATED APPLICATIONS

This application claims priority to and the benefit of U.S. Provisional Patent Application No. 62/870,934 titled "Goal-Directed Occupancy Prediction for Lane-Following Actors," filed Jul. 5, 2019 and U.S. Provisional Patent Application No. 62/991,799 titled "Goal-Directed Occupancy Prediction for Autonomous Driving," filed Mar. 19, 2020, both of which are hereby incorporated by reference herein in their entirety.

FIELD

The present disclosure relates generally to improving the ability of computing devices to plan motion paths for autonomous vehicles.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of object prediction for autonomous driving. The method includes obtaining, by a computing system comprising one or more computing devices and based at least in part on sensor data associated with a set of sensors of an autonomous vehicle, state data associated with an object in an environment external to the autonomous vehicle, obtaining, by the computing system, map data including information associated with spatial relationships between at least a subset of lanes of a road network associated with the environment, determining, by the computing system, a set of candidate paths that the object may follow in the environment based at least in part on the spatial relationships between at least two lanes of the road network, wherein each candidate path includes a respective set of spatial cells, determining, by the computing system for each candidate path of the set of candidate paths, a predicted occupancy for each spatial cell of the respective set of spatial cells of such candidate path during at least a portion of a prediction time horizon, and generating, by the computing system, prediction data associated with the object based at least in part on the predicted occupancy for each spatial cell of the respective set of spatial cells for at least one candidate path.

Another example aspect of the present disclosure is directed to an autonomous vehicle including a sensor system configured to generate sensor data of an environment external to the autonomous vehicle, one or more processors, and one or more non-transitory computer-readable media that collectively store a machine-learned model configured to estimate occupancies for candidate paths that a detected object may follow in the environment based at least in part on spatial relationships between lanes of a road network associated with the environment. The one or more non-transitory computer-readable media collectively store instructions that, when executed by the one or more processors, cause the computing system to perform operations. The operations include inputting, to the machine-learned model, state data associated with the object and map data including information associated with spatial relationships between at least a subset of lanes of the road network associated with the environment, determining, by the machine-learned model in response to the state data and the map data, a candidate path that the object may follow in the environment, wherein the candidate path includes a set of spatial cells, determining, by the machine-learned model, a predicted occupancy for each spatial cell of the set of spatial cells for the candidate path, and generating prediction data associated with the object based at least in part on the predicted occupancy for each spatial cell of the set of spatial cells for the candidate path.

Yet another example aspect of the present disclosure is directed to one or more non-transitory computer-readable media that collectively store instructions that, when executed by the one or more processors, cause the computing system to perform operations. The operations include inputting, to a machine-learned model, state data associated with an object and map data including information associated with spatial relationships between at least a subset of lanes of a road network associated with an environment external to an autonomous vehicle, determining, by the machine-learned model in response to the state data and the map data, a candidate path that the object may follow in the environment, wherein the candidate path includes a set of spatial cells, determining, by the machine-learned model, a predicted occupancy for each spatial cell of the set of spatial cells for the candidate path, and generating prediction data associated with the object based at least in part on the predicted occupancy for each spatial cell of the set of spatial cells for the candidate path.

Other example aspects of the present disclosure are directed to systems, methods, vehicles, apparatuses, tangible, non-transitory computer-readable media, and memory devices for motion planning for autonomous vehicles.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
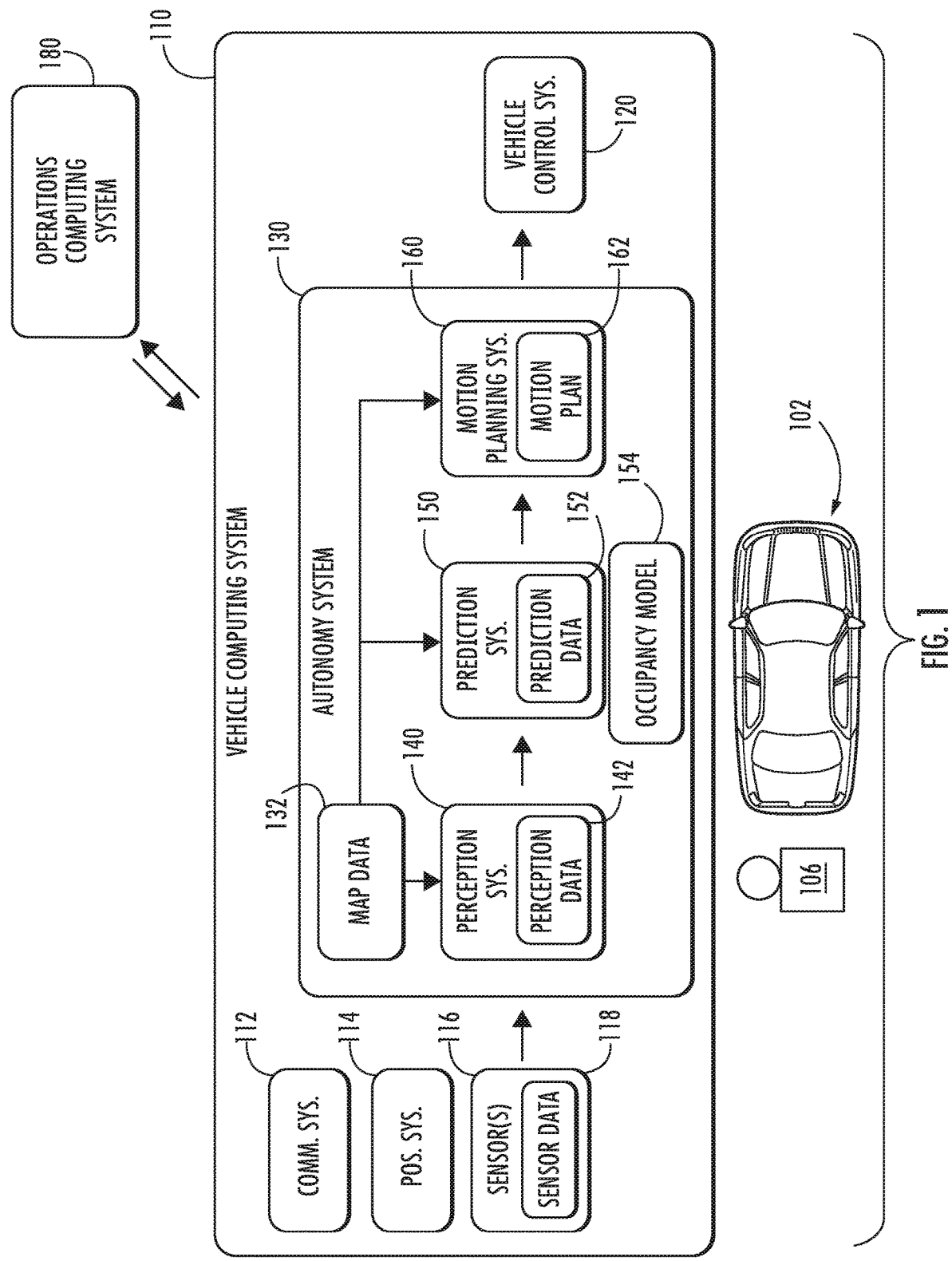
FIG. 1 depicts an example system overview including an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to improved systems and methods for predicting the future behavior (e.g., position and/or motion) of objects using prediction models that utilize goal-oriented data associated with the objects, such as lane-level information of a road network. More particularly, a machine-learned occupancy model of an autonomy computing system for an autonomous vehicle can utilize map data that includes information associated with spatial relationships of lanes of a road network to more accurately predict the future state of an object. These spatial relationships of the lanes can be used to develop a set of candidate paths that the object may follow. The information regarding spatial relationships between lanes can enable the encoding of important semantics about how objects may move within a road network. This enables the model to reason over possible goals to predict the future spatial occupancy of areas by dynamic road actors. In some examples, each path can be discretized into a respective set of spatial cells along its length. Each candidate path can then be considered independently to predict the occupancy of each cell of the candidate path by the object. For example, an output vector can be generated for each path where each element in the vector represents a probability of the object occupying a respective cell along the path during a prediction horizon. In some examples, a set of candidate paths can be represented using a lane graph where nodes represent lane segments and nodes represent connections between lane segments. In this manner, the predicted occupancy of spatial cells along the set of paths can be jointly predicted over the lane graph. Prediction data can be generated for the autonomy computing system based on the occupancy predictions. For example, the future occupancy data of an object can be provided as prediction data to a motion planning system to generate one or more motion plans for the autonomous vehicle. In other examples, the future occupancy data can be converted to one or more object trajectories which can be provided to the motion planning system to generate one or more motion plans for the autonomous vehicle. By encoding map data into a machine-learned occupancy model as described, the multi-modality of the future behavior of road network actors can be captured. Moreover, the model can adapt to local map context and generalize to unseen road geometries. In this manner, the system can explicitly query the likelihood that an actor will occupy any particular location of interest in the map, without necessarily estimating the likelihood for all locations.

An autonomous vehicle (e.g., ground-based vehicle, aircraft, etc.) can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, GPS, etc.), access map data associated with an environment external to the autonomous vehicle and generate an appropriate motion plan through the vehicle's surrounding environment based on the sensor data and map data. To more accurately and efficiently generate a motion plan through the autonomous vehicle's surrounding environment, an autonomy computing system of an autonomous vehicle can include a machine-learned occupancy model. The occupancy model can be configured to generate goal-oriented candidate paths and generate occupancy predictions along the candidate paths based on map data that indicates spatial relationships between map features such as lanes. This enables the model to adapt to local map contexts and consider an arbitrary number of paths for individual objects of interests.

An occupancy prediction system according to example embodiments may directly use a mapped road topology to propose a broad set of lanes or other paths that objects such as other vehicles, bicycles, pedestrians, etc. may traverse in the future. In some examples, map data may be obtained that encodes a precise topology of a road network. The topological representation can capture information about the spatial relationships between lanes, for example, thereby encoding important semantics about how objects are likely to move through the road network. Such an approach can be contrasted with traditional approaches that ignore such topological information altogether, or that convert such information into a two-dimensional bird's-eye-view of the scene, which can lead to significant information loss. These traditional approaches may under-utilize map information and have difficulty with basic tasks such as having predicted trajectories of actors follow lanes. In many cases, these approaches utilize auxiliary loss functions to prevent actors from being predicted to drive off the road. In accordance with example embodiments of the present disclosure, however, the mapped road topology can be used directly to generate candidate paths that are more likely to follow the road network. These candidate paths can then be used to more accurately predict the occupancy for a sequence of spatial cells along each path, capturing the likelihood than an object may occupy the cell during a prediction horizon. Such an approach enables the system to predict a distribution over the future occupancy of an object or actor within a mapped network of lanes.

In accordance with example embodiments, a machine-learned occupancy prediction model can obtain map data that encodes high-resolution information such as road boundaries, lane boundaries, lane connectivity, lane directions, crosswalks, traffic signals, and/or other details of scene geometry. It is noted that the map data can include less than all of the information described or may include additional information. The prediction model can generate a set of candidate paths that an object may follow using the map data and state data associated with the object. In some examples, the prediction model can include a candidate path generation network that is configured to generate a set of candidate paths based on the map data and perception data including the state data (e.g., object detection data). Each path can be defined as a region in two-dimensional space that is specified by a sequence of lanes.

A set of paths for an object can be generated for an object of interest at a particular time by querying the map to identify lanes that fall within a predetermined distance (e.g., 2 meters) of the object's location. Starting from the object's current position, a path can be generated by following the lane successor relationships, up to a fixed distance, for example. This process can yield a set of candidate paths for the object. The spatial area covered by the union of all the paths can determine the region over which the occupancy of the object can be predicted. In this manner, the map topology can be utilized by the system to predict the occupancy of other actors in these specific regions which are typically of much higher importance.

According to some aspects, each path can be discretized into a sequence of cells. In some examples, a fixed length sequence of cells can be used where the number of cells is determined by a cell length. For instance, the discretization can be constrained to be one-dimensional such that each cell covers the width of a lane. In other examples, a multi-dimensional discretization can be used. During training of the machine-learned occupancy prediction model, the cells can be labeled according to whether or not the object (e.g., the object's polygon) entered that cell during a prediction horizon.

The machine-learned occupancy model can be configured to generate occupancy prediction data given a set of candidate paths and a sequence of cells along each path. In some examples, the model can predict a binary occupancy value for each cell of each path. In other examples, the model can predict a non-binary value, such as a value between 0 and 1 to represent a probability of occupancy for each cell. According to example embodiments, the occupancy of each cell be predicted by considering each path independently and predicting the occupancy only over the cells in a single path. In some examples, paths can share segments or spatial cells and the model can jointly reason to determine a probability of occupancy of a spatial cell associated with multiple paths.

With this approach of processing each path separately, an arbitrary number of paths for an object of interest can be considered without relying on truncation or padding to force the paths into a fixed-size output representation. This flexibility in the number of paths enables the system to adapt to a local map context. For example, a vehicle on a single-lane road far from any intersection may be determined by the system to only have one candidate path. By contrast, a vehicle approaching a 6-way intersection may be determined by the system to have 10 or more candidate paths. This approach further enables a path-centric output representation, enabling the model to generalize very well to unseen road geometries where the map accurately captures the lane topology.

In accordance with example embodiments, a machine-learned occupancy model may include a neural network architecture that is configured to generate occupancy predictions along a proposed goal path. The model can include a first neural network such as a base convolutional neural network (CNN) that is configured to obtain scene information regarding the environment external to the autonomous vehicle and generate scene features. For example, the base CNN can obtain raster data including a bird's eye view scene raster of the environment. The scene raster can be generated from sensor data generated by a set of sensors of the autonomous vehicle, perception data, and/or map data. The base CNN can extract image scene features from the scene raster in example embodiments.

The machine-learned occupancy model can include a second neural network such as an occupancy prediction network configured to generate an output vector including occupancy prediction information. The occupancy prediction network can be a convolutional neural network that includes multiple convolutional layers. The scene features extracted by the base CNN, path features for a candidate path, and object features (e.g., object state data) for a particular object can be provided to the one or more neural networks. For example, the neural network can include layers that combine the scene features, candidate path features (e.g., goal features), and object features from the three independent input streams into a one-dimensional output vector. One or more first neural network layers can combine the input streams and one or more second neural network layers can generate the output vector. More particularly, a first group of fully connected layers can operate on the input streams and include decreasingly sized output nodes. An additionally fully connected layer(s) can produce the output vector, which may include one value per cell to indicate an occupancy prediction for the cell by the object.

The scene information, path information, and object information provided to the machine-learned occupancy model can capture different pieces of information that influence an object's future occupancy. The scene information can capture context from the environment surrounding the object, the path information can capture information about the candidate goal path the object may follow, and the object information can capture the object's current and past behavior.

More particularly, the scene information can capture the geometry of the scene and the position of other objects (e.g., vehicles, pedestrians, etc.) near the object of interest, both of which may affect the object's future behavior. By way of example, a rasterized RGB, LIDAR, and/or RADAR image capturing a bird's-eye view (BEV) representation of the scene at a current time instance can be provided as input to the base CNN. The object of interest can be centered horizontally within the image in some examples. The individual rasters can include an overlay of the candidate path in some examples, capturing the path along which occupancy is being predicted. The rasters in some embodiments can include scene level information. The rasters can provide an unstructured view of the scene in some examples. In some embodiments, a lane or path level raster can be utilized for the input to extract features that are provided to the occupancy network. A path level raster can include a top down or bird's eye view representation including contextual information surrounding the path. A path relative frame can thus be provided to the occupancy network, thereby potentially improving computational efficiency of the system.

The path information can include a set of features that capture additional information about the entire path, beyond that which is provided by the scene information. For example, the path information can include information regarding path curvature and/or information about the object's relationship to the path, such as a path-relative heading. The object information can include a set of features that capture an object's state, such as an object's current and past behavior (e.g., past speed, current speed, etc.).

For each candidate path, the occupancy model can predict the future occupancy of the object of interest along the path. For example, the k-th element in an output representation generated by the occupancy model may represent the probability of the object occupying the k-th cell along the path at any point within the prediction horizon. In some examples, a multi-dimensional output representation may be used to represent the probability of the object occupying the k-th cell along the path at multiple discrete timepoints within the prediction horizon.

In accordance with example aspects of the present disclosure, candidate paths can be represented using graph-based representations such as a lane graph, and occupancy predictions can be generated by predicting occupancy over the lane graph. In some examples, occupancy can be jointly predicted for multiple objects over the lane graph to generate occupancy prediction data. The lane graph can include multiple nodes where each node represents a lane segment of a lane. Each lane segment can correspond to an individual cell of a candidate path. Lane segments may be shared between multiple paths. The lane graph can additionally include edges that represent connections between lane segments. Each edge can have a type that identifies the type of connection between the lane segments. For example, the edge may include a type that identifies whether it is a predecessor or successor to another segment, whether it is adjacent to another segment, whether it is opposing to another segment, and/or whether it is conflicting with another segment. The edges may also include a directionality component that encodes the driving direction for predecessor/successor lanes, the priority for conflicting lanes, etc.

According to example embodiments, the respective set of cells for a set of candidate paths can be converted into nodes of a lane graph. Multiple paths may share a node in example embodiments. The connections between the cells can be represented by edges of the lane graph. In some examples, a lane graph can be generated for each of a plurality of objects in a scene. The occupancy model can jointly predict occupancy over the lane graph using one or more graph convolutional networks.

A machine-learned occupancy model can be trained in example embodiments using binary labels associated with objects and paths. For example, if a given actor i and a given path j are considered, a binary label $Y_{ijk} \in \{0,1\}$ can be assigned to each cell k along the path. To determine a label for each cell, a future ground truth trajectory of the object (e.g., vehicle) can be used. If the object's ground truth polygon touches the cell at a point over the prediction horizon, the cell can be labeled '1', and otherwise the cell can be labeled '0'. If the object is observed for a duration shorter than the prediction horizon, negative labels can be replaced with a sentinel value (e.g., '−1'). This can enable such cells to be ignored in the loss function such that they are not used for either training or evaluation. This can allow leveraging additional positive samples for training, as positive labels tend to be scarce relative to negative labels.

Embodiments in accordance with the disclosed technology provide a number of technical effects and benefits, particularly in the areas of computing technology, autonomous vehicles, and the integration of computing technology with autonomous vehicles. In particular, example implementations of the disclosed technology provide improved techniques for predicting the behavior of objects in an environment external to an autonomous vehicle. For example, by utilizing one or more implementations of the disclosed technology, a vehicle computing system can more accurately and efficiently predict the behavior of objects that share the road with the autonomous vehicle. By more accurately and efficiently predicting object behavior, embodiments in accordance with the present disclosure can enable safer autonomous driving with respect to the autonomous vehicle and external actors.

In accordance with example embodiments, improved prediction systems for autonomy computing systems can be provided by leveraging the mapped road topology to reason over possible goals (e.g., lanes that may be followed by an actor) and predict the future spatial occupancy of dynamic road actors. A machine-learned occupancy model in accordance with the present disclosure may accurately predict future occupancy, remain consistent with the mapped lane geometry, and naturally capture multi-modality based on the local scene context. Such an approach can avoid mode collapse that is sometimes observed in prior approaches.

According to some aspects of the present disclosure, a topological representation of an environment can be utilized to capture information about the spatial relationships between lanes of a road network, thereby encoding semantic information about how actors may behave relative to the road network. This approach avoids information loss associated with techniques that simply convert map data into a two-dimensional bird's eye view of a scene. By contrast, the topological path-centric approach captures important map information, including semantic information, so that candidate paths for objects can be generated that follow lanes. This approach avoids the need to use auxiliary loss functions to prevent actors from being predicted to travel off a road, as used by some prior systems. Accordingly, an occupancy model as described can encode structure from a map into the model itself. As such, the model is able to naturally capture the multi-modality of the future behavior of lane-following actors, adapts to the local map context, generalizes to unseen road geometries, and allows the system to query the likelihood that an actor will occupy any particular location of interest in the map, without necessarily estimating the likelihood for all locations.

Accordingly, an autonomous vehicle according to example embodiments of the present disclosure can include a sensor system configured to generate sensor data of an environment external to the autonomous vehicle, one or more processors, and one or more non-transitory computer-readable media that collectively store a machine-learned model configured to estimate occupancies for candidate paths that a detected object may follow in the environment based at least in part on spatial relationships between lanes of a road network associated with the environment. The media can include instructions that, when executed by the one or more processors, cause the computing system to perform operations. The operations can include inputting, to the machine-learned model, state data associated with the object and map data including information associated with spatial relationships between at least a subset of lanes of the road network associated with the environment. The operations can include determining, by the machine-learned model in response to the state data and the map data, a candidate path that the object may follow in the environment, wherein the candidate path includes a set of spatial cells. The operations can include determining, by the machine-learned model, a predicted occupancy for each spatial cell of the set of spatial cells for the candidate path, and generating prediction data associated with the object based at least in part on the predicted occupancy for each spatial cell of the set of spatial cells for the candidate path.

According to some example embodiments, an autonomous vehicle can include a computing system that is configured to obtain state date associated with an object in an environment external to the autonomous vehicle and obtain map data including information associated with spatial relationships between at least a subset of lanes of a road network associated with the environment. The autonomous vehicle can determine a set of candidate paths that the object may follow in the environment based at least in part on the spatial relationships between at least two lanes of the road network. Each candidate path can include a respective set of spatial cells. The autonomous vehicle can determine, for each candidate path of the set of candidate paths, a predicted occupancy for each spatial cell of the respective set of spatial cells of such candidate path during at least a portion of a prediction time horizon. The autonomous vehicle can generate prediction data associated with the object based at least in part on the predicted occupancy for each spatial cell of the respective set of spatial cells for at least one candidate path.

With reference now to the figures, example embodiments of the present disclosure will be discussed in further detail. FIG. 1 depicts an example system overview including an autonomous vehicle according to example embodiments of the present disclosure. FIG. 1 illustrates an example vehicle computing system 110 which can be associated with a vehicle 102 in accordance with example embodiments. The vehicle computing system 110 can be located onboard (e.g., included on and/or within) the vehicle 102.

The vehicle 102 incorporating the vehicle computing system 110 can be various types of vehicles. In some implementations, the vehicle 102 can be an autonomous vehicle. For instance, the vehicle 102 can be a ground-based autonomous vehicle such as an autonomous car, autonomous truck, autonomous bus, etc. The vehicle 102 can be an air-based autonomous vehicle (e.g., airplane, helicopter, bike, scooter, or other aircraft) or other types of vehicles (e.g., watercraft, etc.). The vehicle 102 can drive, navigate, operate, etc. with minimal and/or no interaction from a human operator 106 (e.g., driver). An operator 106 (also referred to as a vehicle operator) can be included in the vehicle 102 and/or remote from the vehicle 102. Moreover, in some implementations, the vehicle 102 can be a non-autonomous vehicle. The operator 106 can be associated with the vehicle 102 to take manual control of the vehicle, if necessary. For instance, in a testing scenario, a vehicle 102 can be periodically tested with controlled faults that can be injected into an autonomous vehicle's autonomy system 130. This can help the vehicle's response to certain scenarios. A vehicle operator 106 can be located within the vehicle 102 and/or remote from the vehicle 102 to take control of the vehicle 102 (e.g., in the event the fault results in the vehicle exiting from a fully autonomous mode in the testing environment).

The vehicle 102 can be configured to operate in a plurality of operating modes. For example, the vehicle 102 can be configured to operate in a fully autonomous (e.g., self-driving) operating mode in which the vehicle 102 is controllable without user input (e.g., can drive and navigate with no input from a vehicle operator present in the vehicle 102 and/or remote from the vehicle 102). The vehicle 102 can operate in a semi-autonomous operating mode in which the vehicle 105 can operate with some input from a vehicle operator present in the vehicle 102 (and/or a human operator that is remote from the vehicle 102). The vehicle 102 can enter into a manual operating mode in which the vehicle 102 is fully controllable by a vehicle operator 106 (e.g., human driver, pilot, etc.) and can be prohibited and/or disabled (e.g., temporary, permanently, etc.) from performing autonomous navigation (e.g., autonomous driving). In some implementations, the vehicle 102 can implement vehicle operating assistance technology (e.g., collision mitigation system, power assist steering, etc.) while in the manual operating mode to help assist the vehicle operator 106 of the vehicle 102. For example, a collision mitigation system can utilize information concerning vehicle trajectories within the vehicle's surrounding environment to help an operator avoid collisions even when in manual mode.

The operating modes of the vehicle 102 can be stored in a memory onboard the vehicle 102. For example, the operating modes can be defined by an operating mode data structure (e.g., rule, list, table, etc.) that indicates one or more operating parameters for the vehicle 102, while in the particular operating mode. For example, an operating mode data structure can indicate that the vehicle 102 is to autonomously plan its motion when in the fully autonomous operating mode. The vehicle computing system 110 can access the memory when implementing an operating mode.

The operating mode of the vehicle 102 can be adjusted in a variety of manners. For example, the operating mode of the vehicle 102 can be selected remotely, off-board the vehicle 105. For example, a remote computing system (e.g., of a vehicle provider and/or service entity associated with the vehicle 102) can communicate data to the vehicle 102 instructing the vehicle 102 to enter into, exit from, maintain, etc. an operating mode. For example, in some implementations, the remote computing system can be an operations computing system 180, as disclosed herein. By way of example, such data communicated to a vehicle 102 by the operations computing system 180 can instruct the vehicle 102 to enter into the fully autonomous operating mode. In some implementations, the operating mode of the vehicle 102 can be set onboard and/or near the vehicle 102. For example, the vehicle computing system 100 can automatically determine when and where the vehicle 102 is to enter, change, maintain, etc. a particular operating mode (e.g., without user input). Additionally, or alternatively, the operating mode of the vehicle 102 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 102). In some implementations, the operating mode of the vehicle 102 can be adjusted by manipulating a series of interfaces in a particular order to cause the vehicle 102 to enter into a particular operating mode.

The vehicle computing system 110 can include one or more computing devices located onboard the vehicle 102.

For example, the computing device(s) can be located on and/or within the vehicle 102. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 102 (e.g., its computing system, one or more processors, etc.) to perform operations and functions, such as those described herein for identifying travel way features.

The vehicle 102 can include a communications system 112 configured to allow the vehicle computing system 110 (and its computing device(s)) to communicate with other computing devices. The vehicle computing system 110 can use the communications system 112 to communicate with one or more computing device(s) that are remote from the vehicle 102 over one or more networks (e.g., via one or more wireless signal connections). For example, the communications system 112 can allow the vehicle computing system 110 to communicate with an operations computing system 180. By way of example, the operations computing system 180 can include one or more remote servers communicatively linked to the vehicle computing system 110. In some implementations, the communications system 112 can allow communication among one or more of the system(s) onboard the vehicle 102. The communications system 112 can include any suitable components for interfacing with one or more network(s), including, for example, transmitters, receivers, ports, controllers, antennas, and/or other suitable components that can help facilitate communication.

As shown in FIG. 1, the vehicle 102 can include one or more vehicle sensor(s) 116, an autonomy computing system 130, one or more vehicle control systems 120, one or more positioning systems 114, and other systems, as described herein. One or more of these systems can be configured to communicate with one another via a communication channel. The communication channel can include one or more data buses (e.g., controller area network (CAN)), onboard diagnostics connector (e.g., OBD-II), and/or a combination of wired and/or wireless communication links. The onboard systems can send and/or receive data, messages, signals, etc. amongst one another via the communication channel.

The vehicle sensor(s) 116 can be configured to acquire sensor data 118. This can include sensor data associated with the surrounding environment of the vehicle 102. For instance, the sensor data 118 can include two-dimensional data depicting the surrounding environment of the vehicle 102. In addition, or alternatively, the sensor data 118 can include three-dimensional data associated with the surrounding environment of the vehicle 102. For example, the sensor(s) 116 can be configured to acquire image(s) and/or other two- or three-dimensional data within a field of view of one or more of the vehicle sensor(s) 116. The vehicle sensor(s) 116 can include a Light Detection and Ranging (LIDAR) system, a Radio Detection and Ranging (RADAR) system, one or more cameras (e.g., visible spectrum cameras, infrared cameras, etc.), motion sensors, and/or other types of two-dimensional and/or three-dimensional capturing devices. The sensor data 118 can include image data, radar data, LIDAR data, and/or other data acquired by the vehicle sensor(s) 116. For example, the vehicle sensor(s) 116 can include a front-facing RGB camera mounted on top of the vehicle 102 and the sensor data 118 can include an RGB image depicting the surrounding environment of the vehicle 102. In addition, or alternatively, the vehicle sensor(s) 116 can include one or more LIDAR sensor(s) and the sensor data 118 can include one or more sparse sets of LIDAR measurements. Moreover, the vehicle 102 can also include other sensors configured to acquire data associated with the vehicle 102. For example, the vehicle 102 can include inertial measurement unit(s), wheel odometry devices, and/or other sensors. In some implementations, the sensor data 118 and/or map data 132 can be processed to select one or more target trajectories for traversing within the surrounding environment of the vehicle 102.

In addition to the sensor data 118, the autonomy computing system 130 can retrieve or otherwise obtain map data 132. The map data 132 can provide static world representations about the surrounding environment of the vehicle 102. For example, in some implementations, a vehicle 102 can exploit prior knowledge about the static world by building very detailed maps (HD maps) that represent not only the roads, buildings, bridges, and landmarks, but also traffic lanes, signs, and lights to centimeter accurate three-dimensional representations. More particularly, map data 132 can include information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other data that provides information that assists the vehicle 102 in comprehending and perceiving its surrounding environment and its relationship thereto.

The vehicle 102 can include a positioning system 114. The positioning system 114 can determine a current position of the vehicle 102. The positioning system 114 can be any device or circuitry for analyzing the position of the vehicle 102. For example, the positioning system 114 can determine a position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 102 can be used by various systems of the vehicle computing system 110 and/or provided to a remote computing system. For example, the map data 132 can provide the vehicle 102 relative positions of the elements of a surrounding environment of the vehicle 102. The vehicle 102 can identify its position within the surrounding environment (e.g., across six axes, etc.) based at least in part on the map data 132. For example, the vehicle computing system 110 can process the sensor data 118 (e.g., LIDAR data, camera data, etc.) to match it to a map of the surrounding environment to get an understanding of the vehicle's position within that environment.

The autonomy computing system 130 can include a perception system 140, a prediction system 150, a motion planning system 160, and/or other systems that cooperate to perceive the surrounding environment of the vehicle 102 and determine a motion plan for controlling the motion of the vehicle 102 accordingly.

For example, the autonomy computing system 130 can obtain the sensor data 118 from the vehicle sensor(s) 116, process the sensor data 118 (and/or other data) to perceive its surrounding environment, predict the motion of objects within the surrounding environment, and generate an appropriate motion plan through such surrounding environment. The autonomy computing system 130 can communicate with the one or more vehicle control systems 120 to operate the vehicle 102 according to the motion plan.

The vehicle computing system 100 (e.g., the autonomy computing system 130) can identify one or more objects that are proximate to the vehicle 102 based at least in part on the sensor data 118 and/or the map data 132. For example, the vehicle computing system 110 (e.g., the perception system 140) can process the sensor data 118, the map data 132, etc. to obtain perception data 142. The vehicle computing system 110 can generate perception data 142 that is indicative of one or more states (e.g., current and/or past state(s)) of a plurality of objects that are within a surrounding environment of the vehicle 102. For example, the perception data 142 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class); the uncertainties associated therewith, and/or other state information. The perception system 140 can provide the perception data 142 to the prediction system 150, the motion planning system 160, and/or other system(s).

The prediction system 150 can be configured to predict a motion of the object(s) within the surrounding environment of the vehicle 102. For instance, the prediction system 150 can generate prediction data 152 associated with such object(s). The prediction data 152 can be indicative of one or more predicted future locations of each respective object. For example, the prediction system 150 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 152 can be indicative of the speed and/or acceleration at which the respective object is predicted to travel along its associated predicted motion trajectory. The prediction system 150 can output the prediction data 152 (e.g., indicative of one or more of the predicted motion trajectories) to the motion planning system 160.

The vehicle computing system 110 (e.g., the motion planning system 160) can determine a motion plan 162 for the vehicle 102 based at least in part on the perception data 142, the prediction data 152, and/or other data.

A motion plan 162 can include vehicle actions (e.g., planned vehicle trajectories, speed(s), acceleration(s), other actions, etc.) with respect to one or more of the objects within the surrounding environment of the vehicle 102 as well as the objects' predicted movements. For instance, the motion planning system 160 can implement an optimization algorithm, model, etc. that considers cost data associated with a vehicle action as well as other objective functions (e.g., cost functions based on speed limits, traffic lights, etc.), if any, to determine optimized variables that make up the motion plan 162. The motion planning system 160 can determine that the vehicle 102 can perform a certain action (e.g., pass an object, etc.) without increasing the potential risk to the vehicle 102 and/or violating any traffic laws (e.g., speed limits, lane boundaries, signage, etc.). For instance, the motion planning system 160 can evaluate one or more of the predicted motion trajectories of one or more objects during its cost data analysis as it determines an optimized vehicle trajectory through the surrounding environment. The motion planning system 160 can generate cost data associated with such trajectories. In some implementations, one or more of the predicted motion trajectories may not ultimately change the motion of the vehicle 102 (e.g., due to an overriding factor). In some implementations, the motion plan 162 may define the vehicle's motion such that the vehicle 102 avoids the object(s), reduces speed to give more leeway to one or more of the object(s), proceeds cautiously, performs a stopping action, etc.

The motion planning system 160 can be configured to continuously update the vehicle's motion plan 162 and a corresponding planned vehicle motion trajectory. For example, in some implementations, the motion planning system 160 can generate new motion plan(s) for the vehicle 102 (e.g., multiple times per second). Each new motion plan can describe a motion of the vehicle 102 over the next planning period (e.g., next several seconds). Moreover, a new motion plan may include a new planned vehicle motion trajectory. Thus, in some implementations, the motion planning system 160 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 102.

The vehicle computing system 110 can cause the vehicle 102 to initiate a motion control in accordance with at least a portion of the motion plan 162. A motion control can be an operation, action, etc. that is associated with controlling the motion of the vehicle. For instance, the motion plan 162 can be provided to the vehicle control system(s) 120 of the vehicle 102. The vehicle control system(s) 120 can be associated with a vehicle controller (e.g., including a vehicle interface) that is configured to implement the motion plan 162. The vehicle controller can, for example, translate the motion plan into instructions for the appropriate vehicle control component (e.g., acceleration control, brake control, steering control, etc.). By way of example, the vehicle controller can translate a determined motion plan 162 into instructions to adjust the steering of the vehicle 102 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 162 (e.g., by sending control signal(s), making the translated plan available, etc.). This can allow the vehicle 102 to autonomously travel within the vehicle's surrounding environment.

Although many examples are described herein with respect to autonomous vehicles, the disclosed technology is not limited to autonomous vehicles. In fact, any object capable of collecting sensor data and map data can utilize the technology described herein for generating a target trajectory. For example, a non-autonomous vehicle may utilize aspects of the present disclosure to generate a target trajectory for an operator of the non-autonomous vehicle, notify the vehicle operator of the target trajectory, and take precautionary measures based on the identified target trajectory. Likewise, a smart phone with one or more cameras, a robot, augmented reality system, and/or another type of system can utilize aspects of the present disclosure to generate target trajectories.

Figure 2A:
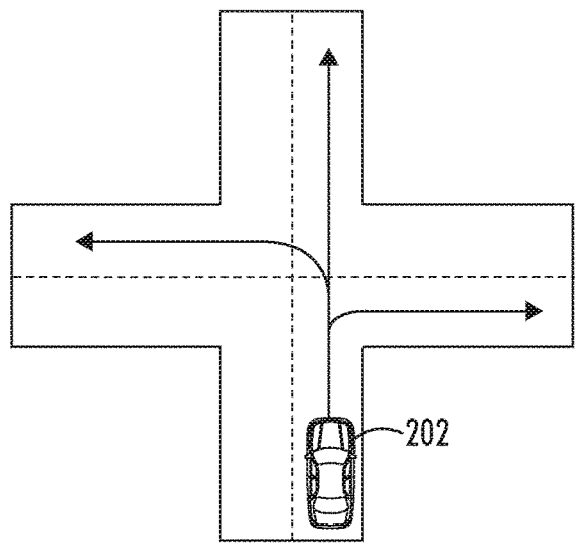
FIGS. 2A-2B depict example road networks and a set of high-level maneuvers used to summarize actor behavior.
Figure 2B:
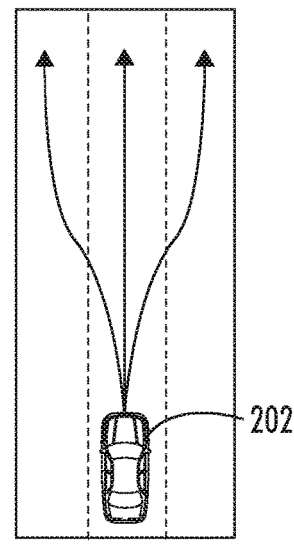

FIGS. 2A-2B depict example road networks and a set of high-level maneuvers used to summarize actor behavior. FIGS. 2A-2B illustrate relatively simple scenarios that a vehicle may encounter in an environment including a road network including multiple lanes. For example, a vehicle 202 in FIGS. 2A-2B is shown alongside a set of behavioral assumptions 204 as may be used by a traditional approach of multi-modal prediction models. For example, such models may that may assume that the actor behavior can be summarized by a simple set of high-level maneuvers such as left/right/straight.

Figure 3:
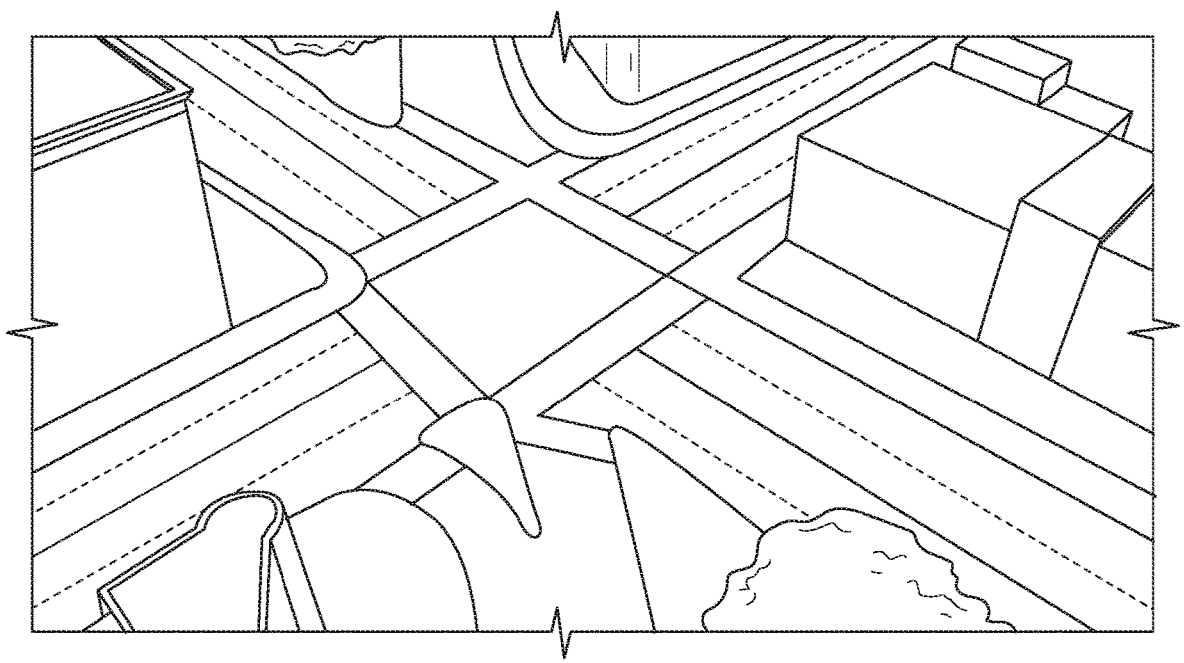
FIG. 3 depicts an example road network including a complex intersection or roadways.

FIG. 3 depicts an example road network including a complex intersection of roadways. FIG. 3 illustrates an example of many real-world scenarios where intersections may be complex, such as the 6-way intersection shown in FIG. 3. As FIG. 3 illustrates, traditional prediction models may have difficulty analyzing actor behavior in such a scenario. If the prediction model uses a left/right/straight set of behavioral assumptions, predicting actor behavior in this scenario may not accurately reflect the true set of options an actor has for moving through the environment.

Referring to FIG. 1, to more accurately and efficiently generate a motion plan through the autonomous vehicle's surrounding environment, an autonomy computing system of an autonomous vehicle in accordance with example embodiments can include a machine-learned occupancy model 154 that leverages high-definition map data representing spatial relationships between lanes of a road network. The occupancy model can be configured to generate goal-oriented candidate paths and generate occupancy predictions along the candidate paths based on the map data indicating spatial relationships between map features such as lanes. This enables the model to adapt to local map contexts and consider an arbitrary number of paths for individual objects of interests. One or more machine-learned occupancy models 154 may be implemented as part of prediction system 150 in example embodiments, or separately therefrom.

Figure 4:
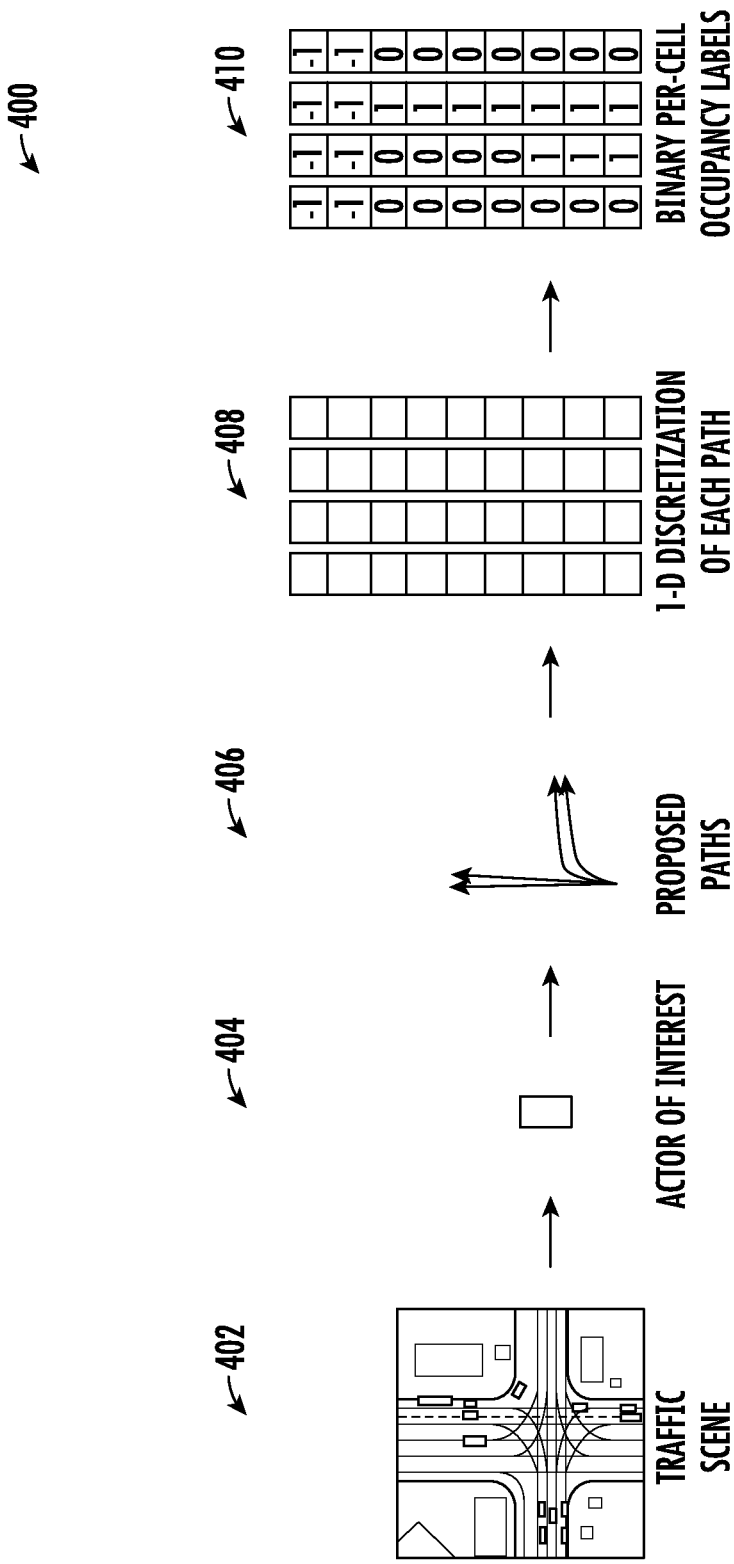
FIG. 4 is a block diagram depicting a process of generating a set of candidate paths including a one-dimensional discretization of each path into spatial cells according to example embodiments of the present disclosure.

FIG. 4 is a block diagram depicting a process 450 of generating a set of candidate paths including a one-dimensional discretization of each path into spatial cells according to example embodiments of the present disclosure. FIG. 4 depicts a process of identifying candidate paths and determining binary labels for each cell of the path. An occupancy prediction system according to example embodiments may directly use a mapped road topology to propose a broad set of lanes or other paths that objects such as other vehicles, bicycles, pedestrians, etc. may traverse in the future.

A machine-learned occupancy model can receive as one or more inputs map data that includes information associated with spatial relationships of lanes of a road network. This map data is illustrated generally at 452 as a traffic scene. In this manner, the model can more accurately predict the future state of an object based on object state data of an actor of interest as shown at 454. The information regarding spatial relationships between lanes can enable the encoding of important semantics about how objects may move within a road network. This enables the model to reason over possible goals to predict the future spatial occupancy of areas by dynamic road actors. In some examples, map data may be obtained that encodes a precise topology of a road network as shown by the traffic scene at 452. The topological representation can capture information about the spatial relationships between lanes, for example, thereby encoding important semantics about how objects such as actor of interest at 454 are likely to move through the road network. The machine-learned occupancy prediction model can obtain map data that encodes high-resolution information such as road boundaries, lane boundaries, lane connectivity, lane directions, crosswalks, traffic signals, and/or other details of scene geometry. It is noted that the map data can include less than all of the information described or may include additional information.

These spatial relationships of the lanes can be used to develop a set of candidate or proposed paths that the object may follow as shown at 456. The mapped road topology can be used directly to generate candidate or proposed paths that are more likely to follow the road network. These candidate paths can then be used to more accurately predict the occupancy for a sequence of spatial cells along each path, capturing the likelihood than an object may occupy the cell during a prediction horizon. Such an approach enables the system to predict a distribution over the future occupancy of an object or actor within a mapped network of lanes. In some examples, the prediction model can include a candidate path generation network that is configured to generate a set of candidate paths based on the map data and perception data including the state data (e.g., object detection data). Each path can be defined as a region in two-dimensional space that is specified by a sequence of lanes.

According to some aspects, each path can be discretized into a sequence of cells as at shown at 458. In some examples, a fixed length sequence of cells can be used where the number of cells is determined by a cell length. For instance, the discretization can be constrained to be one-dimensional such that each cell covers the width of a lane. In other examples, a multi-dimensional discretization can be used. During training of the machine-learned occupancy prediction model, the cells can be labeled according to whether or not the object (e.g., the object's polygon) entered that cell during a prediction horizon. In some examples, each path can be discretized into a respective set of spatial cells along its length. Each candidate path can then be considered independently to predict the occupancy of each cell of the candidate path by the object. For example, an output vector can be generated for each path where each element in the vector represents a probability of the object occupying a respective cell along the path during a prediction horizon.

The machine-learned occupancy model can be configured to generate occupancy prediction data given a set of candidate paths and a sequence of cells along each path. In some examples, the model can be trained based on a predicted binary occupancy value for each cell of each path as shown at 460. In other examples, the model can predict a non-binary value, such as a value between 0 and 1 to represent a probability of occupancy for each cell. According to example embodiments, the occupancy of each cell be predicted by considering each path independently and predicting the occupancy only over the cells in a single path.

In some examples, a lane graph can be used to jointly reason over multiple candidate paths. Lane segments may be represented as nodes in a lane graph. Multiple paths may share one or more nodes in some examples. Edges can represent connections between lane segments and the model can jointly reason over the candidate paths to determine a probability of occupancy of lane segments.

Prediction data can be generated for the autonomy computing system based on the occupancy predictions. For example, the future occupancy data of an object can be provided as prediction data to a motion planning system to generate one or more motion plans for the autonomous vehicle. In other examples, the future occupancy data can be converted to one or more object trajectories which can be provided to the motion planning system to generate one or more motion plans for the autonomous vehicle. By encoding map data into a machine-learned occupancy model as described, the multi-modality of the future behavior of road network actors can be captured. Moreover, the model can adapt to local map context and generalize to unseen road geometries. In this manner, the system can explicitly query the likelihood that an actor will occupy any particular location of interest in the map, without necessarily estimating the likelihood for all locations.

Figure 5:
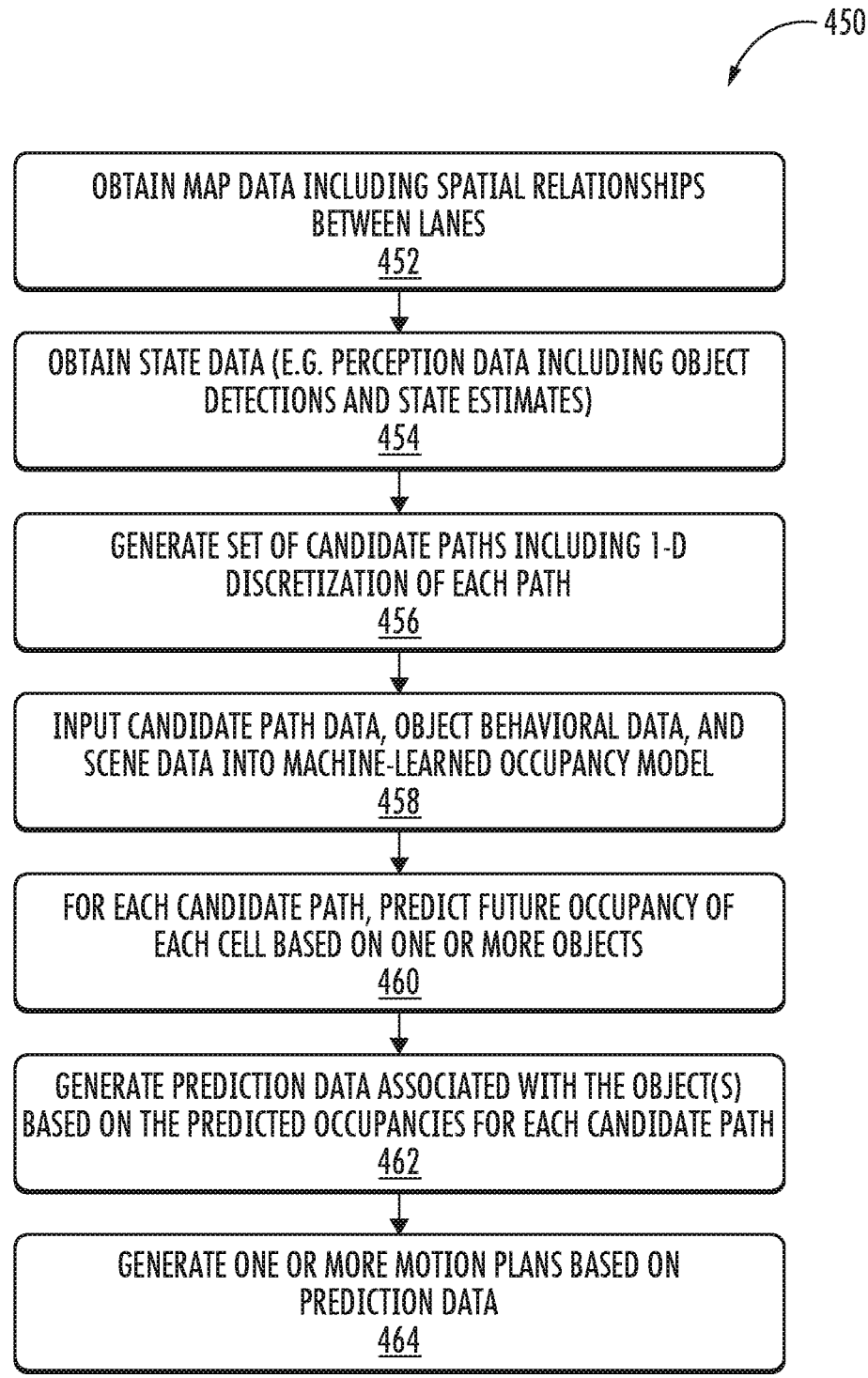
FIG. 5 depicts a flowchart illustrating an example method for generating motion plans based on prediction data from a machine-learned occupancy model according to example embodiments of the present disclosure.

FIG. 5 depicts a flowchart illustrating an example method 400 for generating motion plans based on prediction data from a machine-learned occupancy model according to example embodiments of the present disclosure. One or more portions of method 400 (and the other methods described herein such as method 500 of FIG. 7 and/or method 700 of FIG. 10 can be implemented by one or more computing devices such as, for example, one or more computing devices of vehicle computing system 100 of FIG. 1 and/or computing system 1000 of FIG. 12. One or more portions of method 400 can be implemented as an algorithm on the hardware components of the devices described herein (e.g., as in FIGS. 1 and 12) to, for example, generate occupancy data that can be used for generating autonomous vehicle motion plans. In example embodiments, one or more portions of method 400 may be performed with a machine-learned occupancy model 154 implemented using one or more computing devices of a vehicle computing system (e.g., 110).

At 402, method 400 can include obtaining map data including spatial relationships between lanes. At 404, method 400 can include obtaining state data including object detections and state estimates.

The map data and state data can provide scene information, path information, and object information as input for the machine-learned occupancy model in order to capture different pieces of information that influence an object's future occupancy. The scene information can capture context from the environment surrounding the object, the path information can capture information about the candidate goal path the object may follow, and the object information can capture the object's current and past behavior as object state data, for example.

Scene information can capture the geometry of the scene and the position of other objects (e.g., vehicles, pedestrians, etc.) near the object of interest, both of which may affect the object's future behavior. By way of example, a rasterized RGB, LIDAR, and/or RADAR image capturing a bird's-eye view (BEV) representation of the scene at a current time instance can be provided as input to a base CNN. The object of interest can be centered horizontally within the image in some examples. The individual rasters can include an overlay of the candidate path in some examples, capturing the path along which occupancy is being predicted. The rasters in some embodiments can include scene level information. The rasters can provide an unstructured view of the scene in some examples. In some embodiments, a lane or path level raster can be utilized for the input to extract features that are provided to the occupancy network. A path level raster can include a top down or bird's eye view representation including contextual information surrounding the path. A path relative frame can thus be provided to the occupancy network, thereby potentially improving computational efficiency of the system.

At 406, method 400 can include generating a set of candidate paths including a one-dimensional discretization of each path. The path information can include a set of features that capture additional information about the entire path, beyond that which is provided by the scene information. For example, the path information can include information regarding path curvature and/or information about the object's relationship to the path, such as a path-relative heading. The object information can include a set of features that capture an object's state, such as an object's current and past behavior (e.g., past speed, current speed, etc.). In some examples, generating the set of candidate paths can include generating a lane graph. The lane graph can include a set of nodes that represent lane segments and a set of edges that present connections between lane segments.

At 408, method 400 can include inputting candidate path data, object behavioral data, and scene data into a machine learned occupancy model. At 410, method 400 can include predicting, for each candidate path, the future occupancy of each cell. The future occupancy of each cell can be based on the one or more objects. For each candidate path, the occupancy model can predict the future occupancy of the object of interest along the path. For example, the k-th element in an output representation generated by the occupancy model may represent the probability of the object occupying the k-th cell along the path at any point within the prediction horizon. In some examples, a multi-dimensional output representation may be used to represent the probability of the object occupying the k-th cell along the path at multiple discrete timepoints within the prediction horizon. In some examples, predicting the future occupancy of each cell for each candidate path can be performed using a lane graph. Cells may be associated with lane segments that can be shared between candidate paths. In this manner, the future occupancy of each cell may include a joint prediction based on multiple candidate paths that share a lane segment. The model can jointly predict occupancy over the lane graph.

At 412, method 400 can include generating prediction data associated with the objects based on the predicted occupancies for each candidate path. Prediction data can be generated for the autonomy computing system based on the occupancy predictions. For example, the future occupancy data of an object can be provided as prediction data to a motion planning system to generate one or more motion plans for the autonomous vehicle. In other examples, the future occupancy data can be converted to one or more object trajectories which can be provided to the motion planning system to generate one or more motion plans for the autonomous vehicle. At 414, method 400 can include generating one or more motion plans based on the prediction data.

Figure 6:
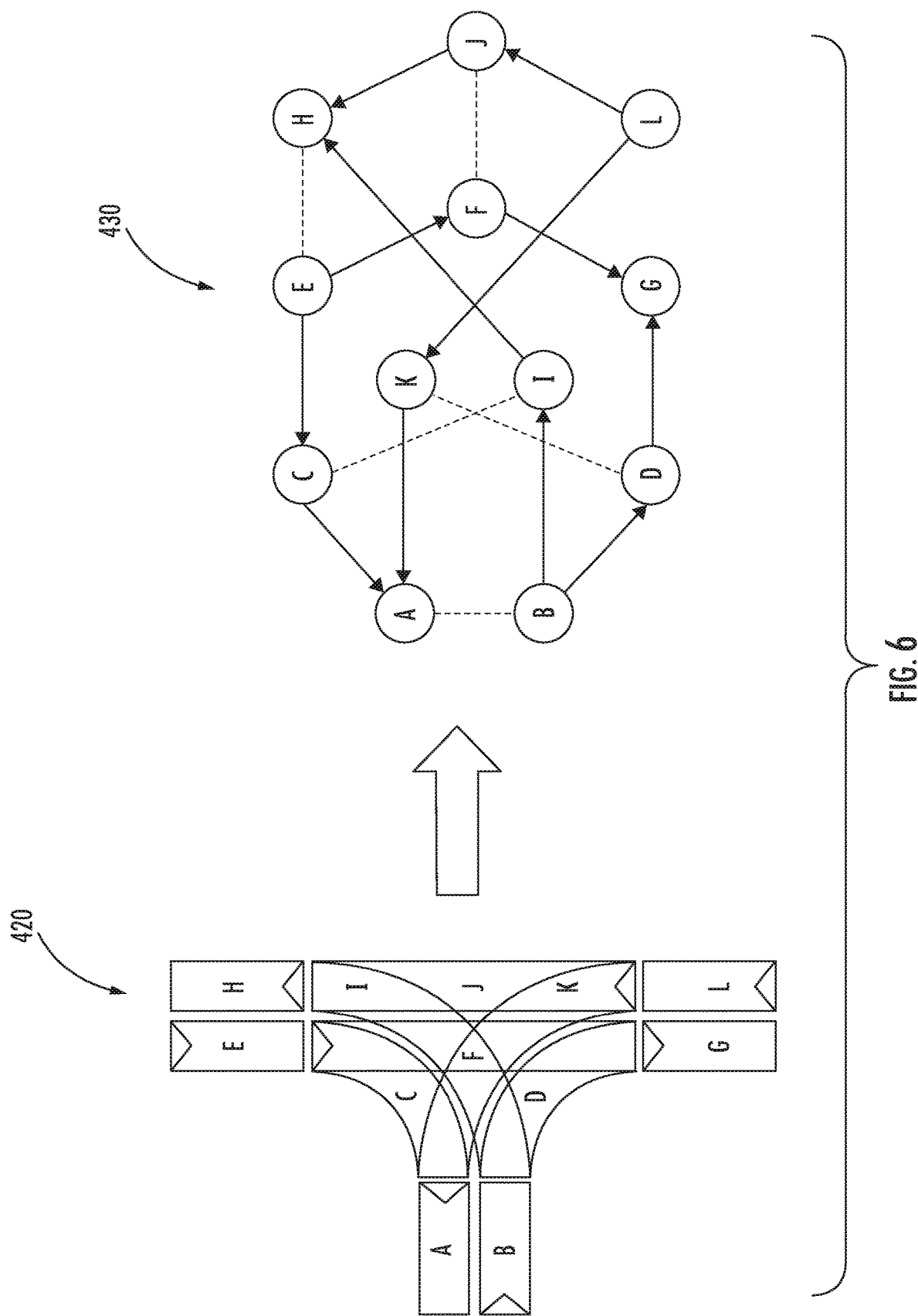
FIG. 6 is a block diagram depicting a process of jointly predicting occupancy over a lane graph using one or more graph convolutional networks (GCN)

FIG. 6 is a block diagram depicting a process of jointly predicting occupancy over a lane graph using one or more graph convolutional networks (GCNs). FIG. 6 depicts a set of candidate paths represented as lane segments A-L of a road network 420. By way of example, a first candidate path can be represented by lane segments B-D-G and a second candidate path can be represented by lane segments B-F-I-H. These candidate paths illustrate that multiple paths may share lane segments. FIG. 6 depicts a lane graph 430 that can be constructed from the set of lane segments to represent the set of candidate paths. The lane segments in the lane graph 430 are represented by nodes A-L and edges represent connections between lane segments. Each edge can have a type such as predecessor/successor, adjacent, opposing, conflicting, etc. Additionally, or alternatively, each edge can have a directionality which can encode driving direction for predecessor/successor lanes, priority for conflicting lanes, etc. The occupancy prediction system can use the GCN to jointly predict occupancy over the entire lane graph. In this manner, the system can jointly reason over lane segments represented as nodes that can be shared between multiple candidate paths.

Figure 7:
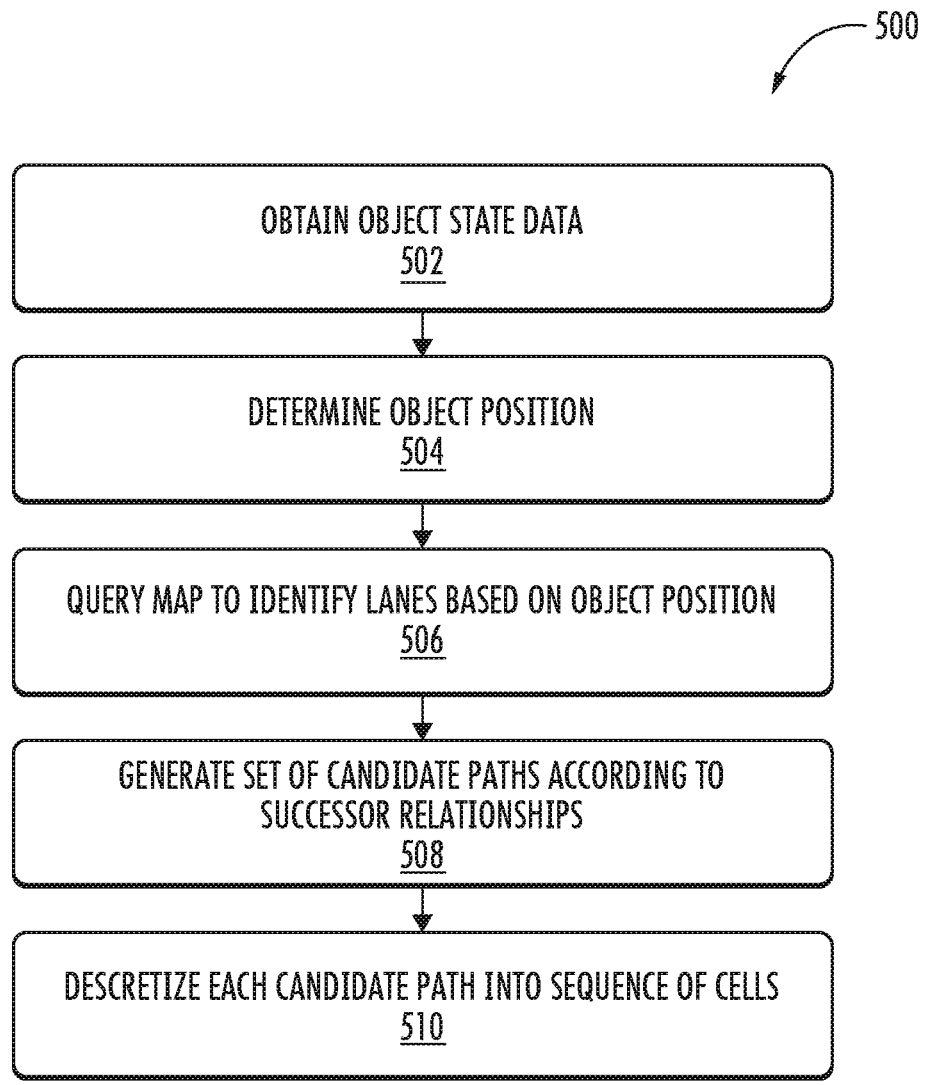
FIG. 7 depicts a flowchart illustrating an example method for generating a set of candidate paths associated with an object according to example embodiments of the present disclosure.

FIG. 7 depicts a flowchart illustrating an example method 500 for generating a set of candidate paths associated with an object according to example embodiments of the present disclosure.

At 502, method 500 can include obtaining object state data. At 504, method 500 can include determining an object's position. As examples, the state data for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system can determine state data 130 for each object over a number of iterations. In particular, the perception system can update the state data for each object at each iteration. Thus, the perception system can detect and track objects (e.g., vehicles, bicycles, pedestrians, etc.) that are proximate to the vehicle over time, and thereby produce a presentation of the world around an vehicle 12 along with its state (e.g., a presentation of the objects of interest within a scene at the current time along with the states of the objects).

At 506, method 500 can include querying a map to identify lanes based on object position. A set of paths for an object can be generated for an object of interest at a particular time by querying the map to identify lanes that fall within a predetermined distance (e.g., 2 meters) of the object's location.

At 508, method 500 can include generating a set of candidate paths according to successor relationships. Starting from the object's current position, a path can be generated by following the lane successor relationships, up to a fixed distance, for example. This process can yield a set of candidate paths for the object. The spatial area covered by the union of all the paths can determine the region over which the occupancy of the object can be predicted. In this manner, the map topology can be utilized by the system to predict the occupancy of other actors in these specific regions which are typically of much higher importance.

At 510, method 500 can include discretizing each candidate path into a sequence of cells. A fixed length sequence of cells can be used where the number of cells is determined by a cell length. The discretization can be constrained to be one-dimensional such that each cell covers the width of a lane. In other examples, a multi-dimensional discretization can be used.

Figure 8:
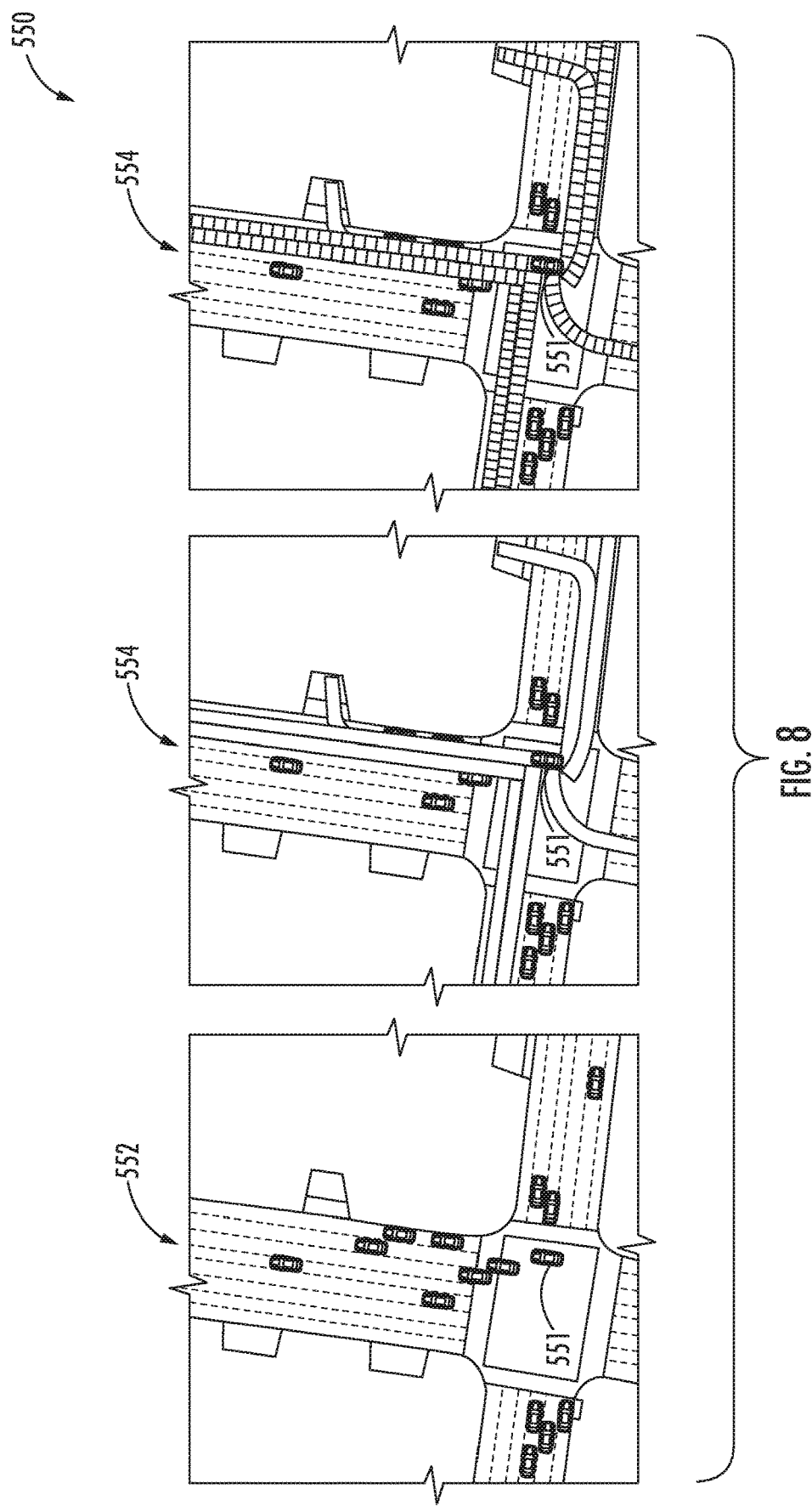
FIG. 8 is a block diagram depicting an example road network and a set of candidate paths including a one-dimensional discretization of each path into spatial cells according to example embodiments of the present disclosure.

FIG. 8 is a block diagram depicting an example road network and a set of candidate paths including a one-dimensional discretization of each path into spatial cells according to example embodiments of the present disclosure. FIG. 8 depicts an actor of interest 551, generally shown at 552 within an example scene. A set of candidate lane paths can be generated for the actor of interest 551 as shown at 554. Each path can be discretized into a set of fixed length cells as shown at 556.

Figure 9:
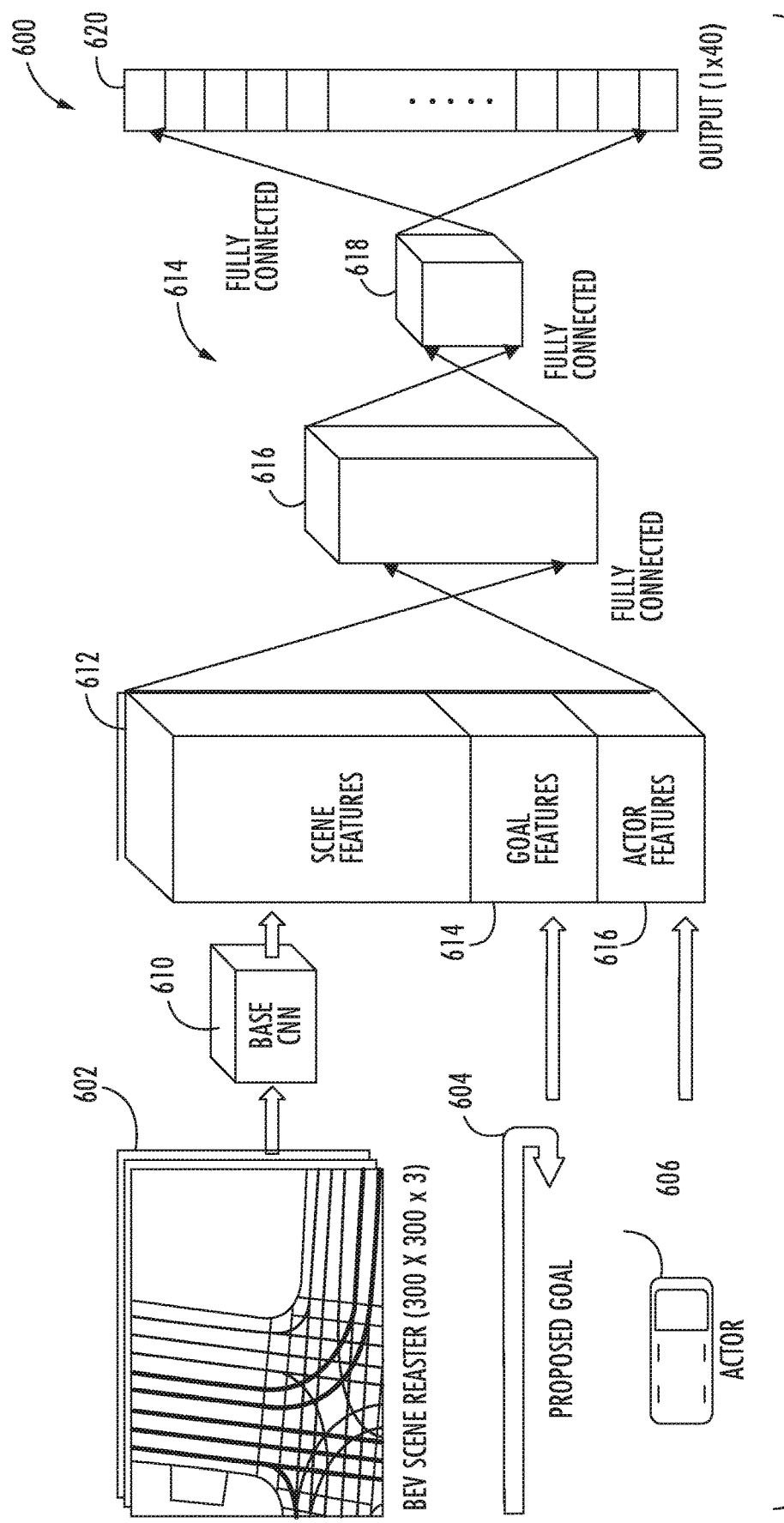
FIG. 9 depicts an example computer architecture of a machine-learned occupancy model according to example embodiments of the present disclosure.

FIG. 9 depicts an example computer architecture of a machine-learned occupancy model 600 according to example embodiments of the present disclosure. The machine-learned occupancy model 600 may include a neural architecture that is configured to generate occupancy predictions along a proposed goal path 602. The model can include a first neural network 610 such as a base convolutional neural network (CNN) that is configured to obtain scene information 602 regarding the environment external to the autonomous vehicle and generate scene features. For example, the base CNN 610 can obtain raster data including a bird's eye view scene raster of the environment. The scene raster can be generated from sensor data generated by a set of sensors of the autonomous vehicle, perception data, and/or map data. The base CNN can extract image scene features 612 from the scene raster in example embodiments.

The machine-learned occupancy model can include a second neural network such as an occupancy prediction network 614 configured to generate an output vector including occupancy prediction information. The occupancy prediction network can be a convolutional neural network that includes multiple convolutional layers. The scene features extracted by the base CNN, path or goal features 614 for a candidate path, and object or actor features 616 (e.g., object state data) for a particular object or actor 606 can be provided to the one or more neural networks. For example, the neural network can include layers that combine the scene features 612, goat features 614 (e.g., candidate path features), and object or actor features 616 from the three independent input streams into a one-dimensional output vector. One or more first neural network layers 616 can combine the input streams and one or more second neural network layers 618 can generate the output vector 620. More particularly, a first group of fully connected layers 616 can operate on the input streams and include decreasingly sized output nodes. Additional fully connected layer(s) 618 can produce the output vector 620, which may include one value per cell to indicate an occupancy prediction for the cell by the object. FIG. 9 describes one example machine-learned model for generating an occupancy probability for a candidate path. Other architectures may be used. For example, a similar model may be utilized to jointly predict occupancy over multiple candidate paths using one or more GCNs.

As a specific example, let $O_k \sim \text{Bernoulli}(p_k)$ be a random variable that indicates whether the k-th cell in the path was occupied at any point over the next H seconds, where H denotes the prediction horizon. It can be assumed that the data includes independent samples from the joint distribution $p(O_1, \ldots, O_M)$, where each sample corresponds to a single candidate path for a single actor. The goal of the occupancy model can be to generate an estimate as set forth in Equation 1:

$$\hat{p}_1, \ldots, \hat{p}_M = \hat{f}(x) \qquad \text{Equation 1}$$

where X denotes the inputs to the model. With this approach of processing each path separately, an arbitrary number of paths for an object of interest can be considered without relying on truncation or padding to force the paths into a fixed-size output representation. This flexibility in the number of paths enables the system to adapt to a local map context. For example, a vehicle on a single-lane road far from any intersection may be determined by the system to only have one candidate path. By contrast, a vehicle approaching a 6-way intersection may be determined by the system to have 10 or more candidate paths. This approach further enables a path-centric output representation, enabling the model to generalize very well to unseen road geometries where the map accurately captures the lane topology.

Figure 10:
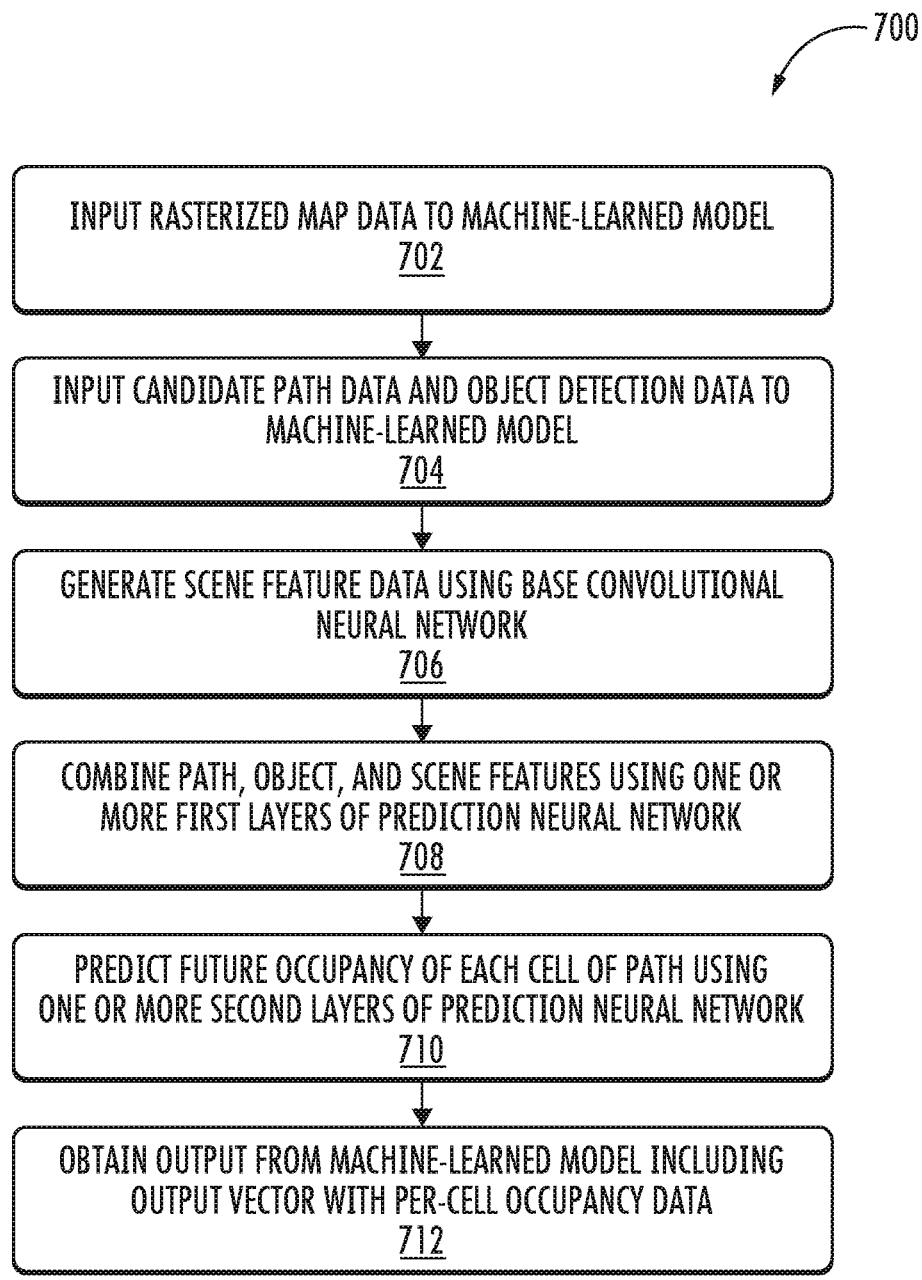
FIG. 10 depicts a flowchart illustrating an example method for predicting future occupancy of a set of spatial cells for a candidate path according to example embodiments of the present disclosure.

FIG. 10 depicts a flowchart illustrating an example method 700 for predicting future occupancy of a set of spatial cells for a candidate path according to example embodiments of the present disclosure.

At 702, method 700 can include inputting rasterized map data to a machine-learned occupancy prediction model. At 704, method 700 can include inputting candidate path data and object detection data to the machine learned model.

At 706, method 700 can include generating scene feature data using a base convolutional neural network. The model can include a first neural network such as a base convolutional neural network (CNN) that is configured to obtain scene information regarding the environment external to the autonomous vehicle and generate scene features. For example, the base CNN can obtain raster data including a bird's eye view scene raster of the environment. The scene raster can be generated from sensor data generated by a set of sensors of the autonomous vehicle, perception data, and/or map data. The base CNN can extract image scene features from the scene raster in example embodiments.

At 708, method 700 can include combining path features, object features, and scene features using one or more first layers of a prediction neural network of the machine learned occupancy prediction model. For example, the neural network can include layers that combine the scene features, candidate path features (e.g., goal features), and object features from the three independent input streams into a one-dimensional output vector. One or more first neural network layers can combine the input streams and one or more second neural network layers can generate the output vector. More particularly, a first group of fully connected layers can operate on the input streams and include decreasingly sized output nodes.

At 710, method 700 can include predicting the future occupancy of each cell of a path the one or more second layers of the prediction neural network. Additional fully connected layer(s) can produce an output vector which may include one value per cell to indicate an occupancy prediction for the cell by the object.

Consider a specific example where a sigmoid cross entropy loss per cell is used and a mean loss over all cells is computed. The notation $Y_{ijk}$ can denote a ground truth binary label for a given cell and $\hat{Y}_{ijk}$ can denote the predicted occupancy. The complete function loss can then be given as set forth in Equation 2:

$$L(Y,\hat{Y}) = \Sigma_{actor\ i} \Sigma_{Path\ j} \Sigma_{cell\ k} I\{Y_{ijk} > 1\} Y_{ijk} \text{Log}(\hat{Y}_{ijk}) + (1-Y_{ijk}) \text{Log}(1-\hat{Y}_{ijk})$$ Equation 2

At 712, method 700 can include obtaining one or more outputs from the machine learned model including an output vector with per-cell occupancy data.

Figure 11:
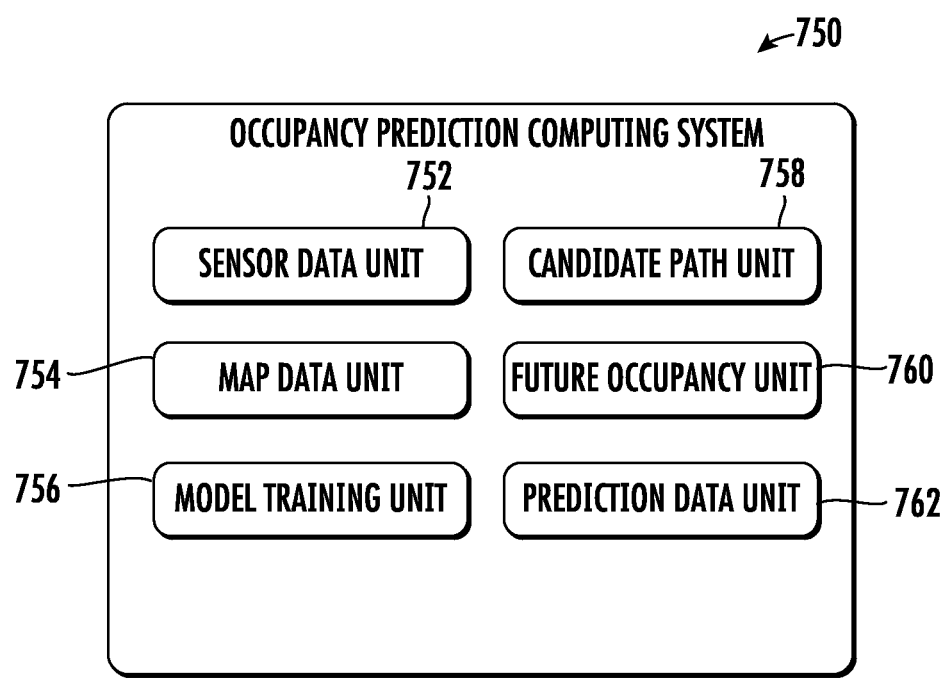
FIG. 11 depicts example system units for performing operations and functions according to example embodiments of the present disclosure.

Various means can be configured to perform the methods and processes described herein. FIG. 11 depicts an example of a computing environment including example means for performing the methods and processes described herein. FIG. 11 depicts an example occupancy prediction computing system 750 with units 752-762 for performing operations and functions according to example embodiments of the present disclosure. For example, the motion planning computing system 750 can include one or more sensor data unit(s) 752, one or more map data unit(s) 754, one or more model training unit(s) 756, one or more candidate path unit(s) 758, one or more future occupancy unit(s) 760, one or more prediction data unit(s) 762, and/or other means for performing the operations and functions described herein. In some implementations, one or more of the units 752-762 may be implemented separately. In some implementations, one or more of the units 752-762 may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. The methods (e.g., method 400, method 500, and/or method 700) and/or other operations described herein can be implemented as such algorithm(s).

The means can be configured to obtain sensor data such as image data (e.g. from one or more image sensors such as cameras, etc.), LIDAR point cloud data associated with an environment external to an autonomous vehicle, RADAR data, etc. The means can be configured to obtain object detection data based at least in part on sensor data associated with a set of sensors of the autonomous vehicle. The object detection data may be associated with one or more objects and in environment external to the almond autonomous vehicle. A sensor data unit 752 is one example of a means for obtaining sensor data such as image data as described herein.

The means can be configured to obtain map data including information associated with spatial relationships between at least a subset of lanes of a road network associated with the environment. In some examples, the map data can include an overhead view of a rasterized map of at least a portion of the environment. The map data can include a respective raster for each lane segment of a plurality of lane segments for each lane the subset of lanes the network. The map data can encode a typology of a road network within the environment in some examples. The respective rasterization for at least one lane segment of at least one lane can include contextual information associated with lane segment. A map data unit 754 is one example of a means for obtaining map data as described herein.

The means can be configured to determine a set of candidate path that an object may follow in environment based at least in part on the spatial relationships between at least two lanes of the road network. Each candidate path can include a respective set of spatial cells. In some examples, the means can be configured to discretize each candidate path of the set of candidate paths into the respective set of spatial cells of the candidate path. In some examples, the means can be configured to generate a lane graph that includes a plurality of nodes associated with a plurality of lane segments of a plurality of lane. The lane graph can include a plurality of edges that represent connections between lane segments. A candidate path unit 758 is one example of a means for determining a set of candidate paths as described herein.

The means can be configured to determine, for each candidate path of a set of candidate path, a predicted occupancy for each spatial cell of the respective set of spatial cells of the candidate path during at least a portion of a prediction time horizon. In some examples, the predicted occupancy for each spatial cell can be determined for a duration of the prediction time horizon. The means can be configured to determine a plurality of predicted occupancies free spatial cell for each of a plurality of time periods over the prediction time horizon. The means can be configured to jointly predict occupancy overall lane graph for a plurality of objects in some examples. For example, the means can be configured to provide data associated with a subset of the nodes of the lane graph corresponding to the candidate path as input to one or more machine learned occupancy models. A future occupancy unit 760 is one example of a means for determining a predicted occupancy of spatial cells of a candidate path as described herein.

The means can be configured to generate prediction data associated with an object based at least in part on the predicted occupancy for each spatial cell of the respective set of spatial cells for at least one candidate path. In some examples, means can be configured to select a first candidate path from the set of candidate path based on the predicted occupancies for the set of spatial cells corresponding to the set candidate path. The means can be configured to generate the prediction data associated with the object based at least in part on the first candidate path. A prediction data unit 762 is one example of a means for generating prediction data based on predicted future occupancy as described herein.

Figure 12:
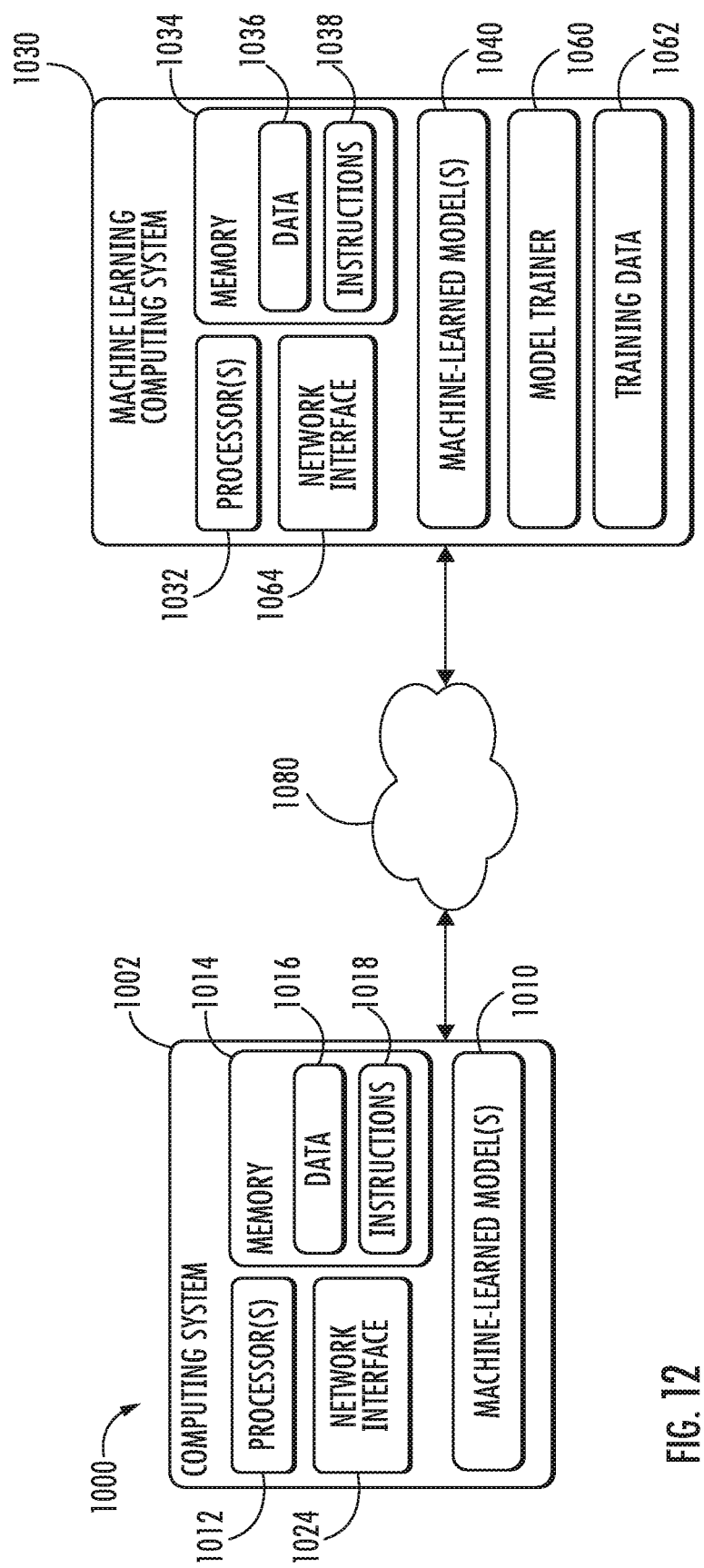
FIG. 12 depicts example system components according to example implementations of the present disclosure.

FIG. 12 depicts example system components according to example implementations of the present disclosure. The example computing system 1000 includes a computing system 1002 and a machine learning computing system 1030 that are communicatively coupled over a network 1080.

In some implementations, the computing system 1002 can perform various operations as part of motion planning for an autonomous vehicle. For example, computing system 1002 can receive sensor data map data associated with an environment external to an autonomous vehicle, and process the sensor data and the map data to generate a target trajectory for the autonomous vehicle, as part of autonomous vehicle operations. In some implementations, the computing system 1002 can be included in an autonomous vehicle. For example, the computing system 1002 can be on-board the autonomous vehicle. In some embodiments, computing system 1002 can be used to implement vehicle computing system 110. In other implementations, the computing system 1002 is not located on-board the autonomous vehicle. For example, the computing system 1002 can operate offline to obtain sensor data and perform target trajectory generation. The computing system 1002 can include one or more distinct physical computing devices.

The computing system 1002 includes one or more processors 1012 and a memory 1014. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processors 1012. For instance, the memory 1014 (e.g., one or more non-transitory computer-readable storage mediums, memory devices) can store data 1016 that can be obtained, received, accessed, written, manipulated, created, and/or stored. The data 1016 can include, for instance, map data, image or other sensor data captured by one or more sensors, machine-learned models, etc. as described herein. In some implementations, the computing system 1002 can obtain data from one or more memory device(s) that are remote from the computing system 1002.

The memory 1014 can also store computer-readable instructions 1018 that can be executed by the one or more processors 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processors 1012 cause the one or more processors 1012 to perform any of the operations and/or functions described herein, including, for example, generating motion plans including target trajectories for an autonomous vehicle, etc.

According to an aspect of the present disclosure, the computing system 1002 can store or include one or more machine-learned models 1010. As examples, the machine-learned models 1010 can be or can otherwise include various machine-learned models such as, for example, neural networks (e.g., deep neural networks or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1002 can receive the one or more machine-learned models 1010 from the machine learning computing system 1030 over network 1080 and can store the one or more machine-learned models 1010 in the memory 1014. The computing system 1002 can then use or otherwise implement the one or more machine-learned models 1010 (e.g., by processor(s) 1012). In particular, the computing system 1002 can implement the machine-learned model(s) 1010 to generate uncertainty data for object detections, predictions, and motion plan generation based on sensor data.

The machine learning computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof. In some embodiments, machine learning computing system 1030 can be used to implement vehicle computing system 110.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, machine-learned models, sensor data, and map data as described herein. In some implementations, the machine learning computing system 1030 can obtain data from one or more memory device(s) that are remote from the machine learning computing system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032.

For example, the memory 1034 can store instructions 1038 that when executed by the one or more processors 1032 cause the one or more processors 1032 to perform any of the operations and/or functions described herein, including, for example, generating motion plans including target trajectories for an autonomous vehicle, and controlling an autonomous vehicle based on the target trajectories.

In some implementations, the machine learning computing system 1030 includes one or more server computing devices. If the machine learning computing system 1030 includes multiple server computing devices, such server computing devices can operate according to various computing architectures, including, for example, sequential computing architectures, parallel computing architectures, or some combination thereof.

In addition or alternatively to the machine-learned model(s) 1010 at the computing system 1002, the machine learning computing system 1030 can include one or more machine-learned models 1040. As examples, the machine-learned models 1040 can be or can otherwise include various machine-learned models such as, for example, neural networks (e.g., deep neural networks) or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1030 can communicate with the computing system 1002 according to a client-server relationship. For example, the machine learning computing system 1030 can implement the machine-learned models 1040 to provide a web service to the computing system 1002. For example, the web service can generate motion plans including target trajectories in response to sensor data and/or other data received from an autonomous vehicle.

Thus, machine-learned models 1010 can located and used at the computing system 1002 and/or machine-learned models 1040 can be located and used at the machine learning computing system 1030.

In some implementations, the machine learning computing system 1030 and/or the computing system 1002 can train the machine-learned models 1010 and/or 1040 through use of a model trainer 1060. The model trainer 1060 can train the machine-learned models 1010 and/or 1040 using one or more training or learning algorithms. One example training technique is backwards propagation of errors. In some implementations, the model trainer 1060 can perform supervised training techniques using a set of labeled training data. In other implementations, the model trainer 1060 can perform unsupervised training techniques using a set of unlabeled training data. The model trainer 1060 can perform a number of generalization techniques to improve the generalization capability of the models being trained. Generalization techniques include weight decays, dropouts, or other techniques.

In particular, the model trainer 1060 can train a machine-learned model 1010 and/or 1040 based on a set of training data 1062. The training data 1062 can include, for example, ground truth data including annotations for sensor data portions and/or vehicle state data. The model trainer 1060 can be implemented in hardware, firmware, and/or software controlling one or more processors.

In some examples, the model trainer 1060 can train a machine-learned model 1010 and/or 1040 configured to generate motion plans including target trajectories as well as intermediate representations associated with one or more of an object detection or an object prediction. In some examples, the machine-learned model 1010 and/or 1040 is trained using sensor data that has been labeled or otherwise annotated as having a correspondence to a detected object, a class of a detected object, etc. By way of example, sensor data collected in association with a particular class of object can be labeled to indicate that it corresponds to an object detection or the particular class. In some instances, the label may be a simple annotation that the sensor data corresponds to a positive training dataset.

The computing system 1002 can also include a network interface 1024 used to communicate with one or more systems or devices, including systems or devices that are remotely located from the computing system 1002. The network interface 1024 can include any circuits, components, software, etc. for communicating with one or more networks (e.g., 1080). In some implementations, the network interface 1024 can include, for example, one or more of a communications controller, receiver, transceiver, transmitter, port, conductors, software and/or hardware for communicating data. Similarly, the machine learning computing system 1030 can include a network interface 1064.

The network(s) 1080 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 12 illustrates one example computing system 1000 that can be used to implement the present disclosure. Other computing systems can be used as well. For example, in some implementations, the computing system 1002 can include the model trainer 1060 and the training data 1062. In such implementations, the machine-learned models 1010 can be both trained and used locally at the computing system 1002. As another example, in some implementations, the computing system 1002 is not connected to other computing systems.

In addition, components illustrated and/or discussed as being included in one of the computing systems 1002 or 1030 can instead be included in another of the computing systems 1002 or 1030. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of object prediction for autonomous driving, the method comprising:
   obtaining, based at least in part on sensor data associated with a plurality of sensors of an autonomous vehicle, state data associated with an object in an environment external to the autonomous vehicle;
   obtaining map data including information associated with spatial relationships between at least a subset of lanes of a road network associated with the environment;
   determining a plurality of candidate paths that the object may follow in the environment based at least in part on the spatial relationships between at least two lanes of the road network, wherein the plurality of candidate paths respectively include a discretized sequence of spatial cells along a candidate path of the plurality of candidate paths;
   determining, for respective candidate paths of the plurality of candidate paths, a predicted occupancy for each spatial cell of the respective spatial cells of the respective candidate paths during at least a portion of a prediction time horizon; and
   generating prediction data associated with the object based at least in part on the predicted occupancy for the respective spatial cells for at least one candidate path.

2. The computer-implemented method of claim 1, further comprising:
   discretizing respective candidate paths of the plurality of candidate paths into the respective spatial cells of the respective candidate paths.

3. The computer-implemented method of claim 1, wherein determining the predicted occupancy for the respective spatial cells for at least one candidate path comprises:
   determining the predicted occupancy for the respective spatial cells for a duration of the prediction time horizon.

4. The computer-implemented method of claim 1, wherein determining the predicted occupancy for the respective spatial cells for at least one candidate path comprises:
   determining a plurality of predicted occupancies for the respective spatial cells for a plurality of time periods over of the prediction time horizon.

5. The computer-implemented method of claim 1, further comprising:
   generating a lane graph comprising a plurality of nodes associated with a plurality of lane segments of a plurality of lanes, the lane graph comprising a plurality of edges that represent connections between lane segments.

6. The computer-implemented method of claim 5, wherein determining, for the respective candidate paths of the plurality of candidate paths, the predicted occupancy for the respective spatial cells of the respective candidate paths, comprises:
   jointly predicting occupancy over the lane graph for a plurality of objects.

7. The computer-implemented method of claim 5, wherein generating the lane graph comprises:
   converting the respective spatial cells for the respective candidate paths of the plurality of candidate paths into nodes in the lane graph with edges connecting the nodes.

8. The computer-implemented method of claim 5, wherein determining, for the respective candidate paths of the plurality of candidate paths, the predicted occupancy for the respective spatial cells of the respective candidate paths, comprises:
   providing data associated with a subset of the nodes corresponding to the respective candidate paths as input to one or more machine-learned occupancy models.

9. The computer-implemented method of claim 1, wherein:
   the map data includes an overhead view of a rasterized map of at least a portion of the environment.

10. The computer-implemented method of claim 1, wherein:
    the map data includes a respective raster for a plurality of lane segments for respective lanes of the subset of lanes of the road network; and
    the respective raster for at least one lane segment of at least one lane includes contextual information associated with such lane segment.

11. The computer-implemented method of claim 1, further comprising:
    generating a motion plan for the autonomous vehicle based at least in part on the prediction data associated with the object.

12. The computer-implemented method of claim 1, wherein determining the predicted occupancy for the respective spatial cells of the respective candidate paths during at least the portion of the prediction time horizon comprises:
    providing data indicative of the respective candidate paths as input to one or more machine-learned occupancy models;
    providing data associated with one or more scene features as input to the one or more machine-learned occupancy models;
    providing state data associated with the object as input to the one or more machine-learned occupancy models; and
    generating, using the one or more machine-learned occupancy models, data indicative of the predicted occupancy for such spatial cell.

13. The computer-implemented method of claim 12, wherein the data associated with one or more scene features is generated by:
    inputting rasterized map data to one or more feature extraction networks of the one or more machine-learned occupancy models and receiving as output of the one or more feature extraction networks the data associated with the one or more scene features.

14. The computer-implemented method of claim 1, wherein the map data encodes a topology of a road network within the environment.

15. The computer-implemented method of claim 1, further comprising:

selecting a first candidate path from the plurality of candidate paths based on the predicted occupancies for the spatial cells corresponding to the pluralities of candidate paths; and wherein the prediction data associated with the object is generated based at least in part on the first candidate path.

16. The computer-implemented method of claim 1, wherein detecting, based at least in part on sensor data associated with the plurality of sensors of the autonomous vehicle, the object in the environment external to the autonomous vehicle comprises:

inputting the sensor data to one or more machine-learned models of a perception computing system of the autonomous vehicle; and receiving as an output of the one or more machine-learned models data indicative of an object detection associated with the object.

17. An autonomous vehicle, comprising:

a sensor system configured to generate sensor data of an environment external to the autonomous vehicle;

one or more processors; and one or more non-transitory computer-readable media that store:

a machine-learned model configured to estimate occupancies for candidate paths that a detected object may follow in the environment based at least in part on spatial relationships between lanes of a road network associated with the environment; and instructions for execution by the one or more processors that cause the one or more processors to perform operations, the operations comprising:

inputting, to the machine-learned model, state data associated with the object and map data including information associated with spatial relationships between at least a subset of lanes of the road network associated with the environment;

determining, by the machine-learned model in response to the state data and the map data, a candidate path that the object may follow in the environment, wherein the candidate path includes a discretized sequence of spatial cells along the candidate path;

determining, by the machine-learned model, a predicted occupancy for each spatial cell of the discretized sequence of spatial cells for the candidate path; and generating prediction data associated with the object based at least in part on the predicted occupancy for each spatial cell of the discretized sequence of spatial cells for the candidate path.

18. The autonomous vehicle of claim 17, wherein the operations further comprise:

discretizing the candidate path into the respective spatial cells of the candidate path.

19. One or more non-transitory computer-readable media that store instructions for execution by one or more processors that cause the one or more processors to perform operations, the operations comprising:

inputting, to a machine-learned model, state data associated with an object and map data including information associated with spatial relationships between at least a subset of lanes of a road network associated with an environment external to an autonomous vehicle;

determining, by the machine-learned model in response to the state data and the map data, a candidate path that the object may follow in the environment, wherein the candidate path includes a discretized sequence of spatial cells along the candidate path;

determining, by the machine-learned model, a predicted occupancy for the respective spatial cells of the discretized sequence of spatial cells for the candidate path; and generating prediction data associated with the object based at least in part on the predicted occupancy for each spatial cell of the discretized sequence of spatial cells for the candidate path.

20. The one or more non-transitory computer-readable media of claim 19, wherein the operations further comprise:

generating a motion plan for the autonomous vehicle based at least in part on the prediction data associated with the object.

* * * * *